(12) United States Patent
Scheerer et al.

(10) Patent No.: US 10,065,749 B2
(45) Date of Patent: Sep. 4, 2018

(54) WING LIFT SYSTEM CAPABILITY EXPANSION

(71) Applicant: The Boeing Company, Chicago, IL (US)

(72) Inventors: David E. Scheerer, Glen Mills, PA (US); Patrick F. Joyce, Ridley Park, PA (US)

(73) Assignee: The Boeing Company, Chicago, IL (US)

( * ) Notice: Subject to any disclaimer, the term of this patent is extended or adjusted under 35 U.S.C. 154(b) by 225 days.

(21) Appl. No.: 14/990,789

(22) Filed: Jan. 7, 2016

(65) Prior Publication Data

US 2017/0197732 A1 Jul. 13, 2017

(51) Int. Cl.
*B64F 5/00* (2017.01)

(52) U.S. Cl.
CPC .................. *B64F 5/0009* (2013.01)

(58) Field of Classification Search
CPC ...... B64F 5/10; B64F 5/40; B64F 5/50; B64F 5/0009; Y10T 29/49622; F05B 2230/61
USPC ...................................................... 414/10–12
See application file for complete search history.

(56) References Cited

U.S. PATENT DOCUMENTS

| | | | | |
|---|---|---|---|---|
| 2,679,364 A * | 5/1954 | Sforza Del Pesaro | ... | B64C 3/40 235/132 E |
| 3,246,861 A * | 4/1966 | Curci | .................. | B64C 29/0033 244/17.23 |
| 3,490,720 A * | 1/1970 | Girard | ....................... | B64C 3/40 244/46 |
| 3,721,403 A * | 3/1973 | Gray | ....................... | B64C 27/02 244/7 A |
| 3,744,742 A * | 7/1973 | Gear | ....................... | B64C 27/50 244/17.11 |
| 3,971,535 A * | 7/1976 | Jones | ....................... | B64C 3/40 244/46 |
| 4,132,374 A * | 1/1979 | Abell | ....................... | B64C 3/40 244/46 |
| 4,691,878 A * | 9/1987 | Vaughan | .................. | B64C 3/56 244/49 |

(Continued)

OTHER PUBLICATIONS

Office Action, dated Jan. 10, 2012, regarding U.S. Appl. No. 112/639,505, 12 pages.

(Continued)

*Primary Examiner* — Ryan J Walters
*Assistant Examiner* — Lawrence Averick
(74) *Attorney, Agent, or Firm* — Yee & Associates, P.C.

(57) ABSTRACT

A method for lifting a wing of an aircraft. A plurality of lifting assemblies is attached to a mounting ring supporting the wing. A first plurality of base assemblies is attached to a plurality of fittings connected to the fuselage of the aircraft. The plurality of lifting assemblies is moved away from the first plurality of base assemblies using a plurality of biasing systems correspondingly attached to the plurality of lifting assemblies, the moving causing the mounting ring to move away from the fuselage. The first plurality of base assemblies is removed. A second plurality of base assemblies is attached to the plurality of fittings. Thereafter, moving the plurality of lifting assemblies away from the second plurality of base assemblies using the plurality of biasing systems is repeated, the repeating moving causing the mounting ring to move away from the fuselage to the first height.

21 Claims, 26 Drawing Sheets

(56) References Cited

U.S. PATENT DOCUMENTS

| | | | | |
|---|---|---|---|---|
| 4,998,689 A * | 3/1991 | Woodcock | B64C 3/38 | 244/201 |
| 5,337,974 A * | 8/1994 | Rumberger | B64C 3/40 | 244/39 |
| 5,454,530 A * | 10/1995 | Rutherford | B64C 27/24 | 244/22 |
| 5,860,624 A * | 1/1999 | Obry | B64G 1/641 | 244/39 |
| 6,450,446 B1 * | 9/2002 | Holben | B64C 27/00 | 244/12.2 |
| 6,669,137 B1 * | 12/2003 | Chen | B64C 3/40 | 244/7 R |
| 7,665,688 B2 * | 2/2010 | Cylinder | B64C 27/24 | 244/56 |
| 8,070,090 B2 * | 12/2011 | Tayman | B64C 27/24 | 244/6 |
| 8,292,216 B1 * | 10/2012 | Rumberger, Jr. | B64C 3/56 | 244/39 |
| 8,371,520 B2 * | 2/2013 | Easter | B60F 5/02 | 244/199.4 |
| 8,387,913 B2 * | 3/2013 | Karem | B64C 3/56 | 244/102 SL |
| 2008/0272244 A1 * | 11/2008 | Bjornenak | B64C 3/385 | 244/7 R |
| 2009/0095838 A1 | 4/2009 | Gerbino | | |
| 2011/0036939 A1 * | 2/2011 | Easter | B60F 5/02 | 244/2 |
| 2011/0042507 A1 * | 2/2011 | Seiford, Sr. | B60F 5/02 | 244/2 |
| 2012/0211608 A1 * | 8/2012 | Pancotti | B64C 29/0033 | 244/7 C |
| 2012/0261523 A1 * | 10/2012 | Shaw | B64C 29/0033 | 244/7 R |
| 2013/0256465 A1 * | 10/2013 | Smith | B64C 27/26 | 244/7 C |

OTHER PUBLICATIONS

Notice of Allowance, dated Apr. 30, 2012, regarding U.S. Appl. No. 112/639,505, 5 pages.

\* cited by examiner

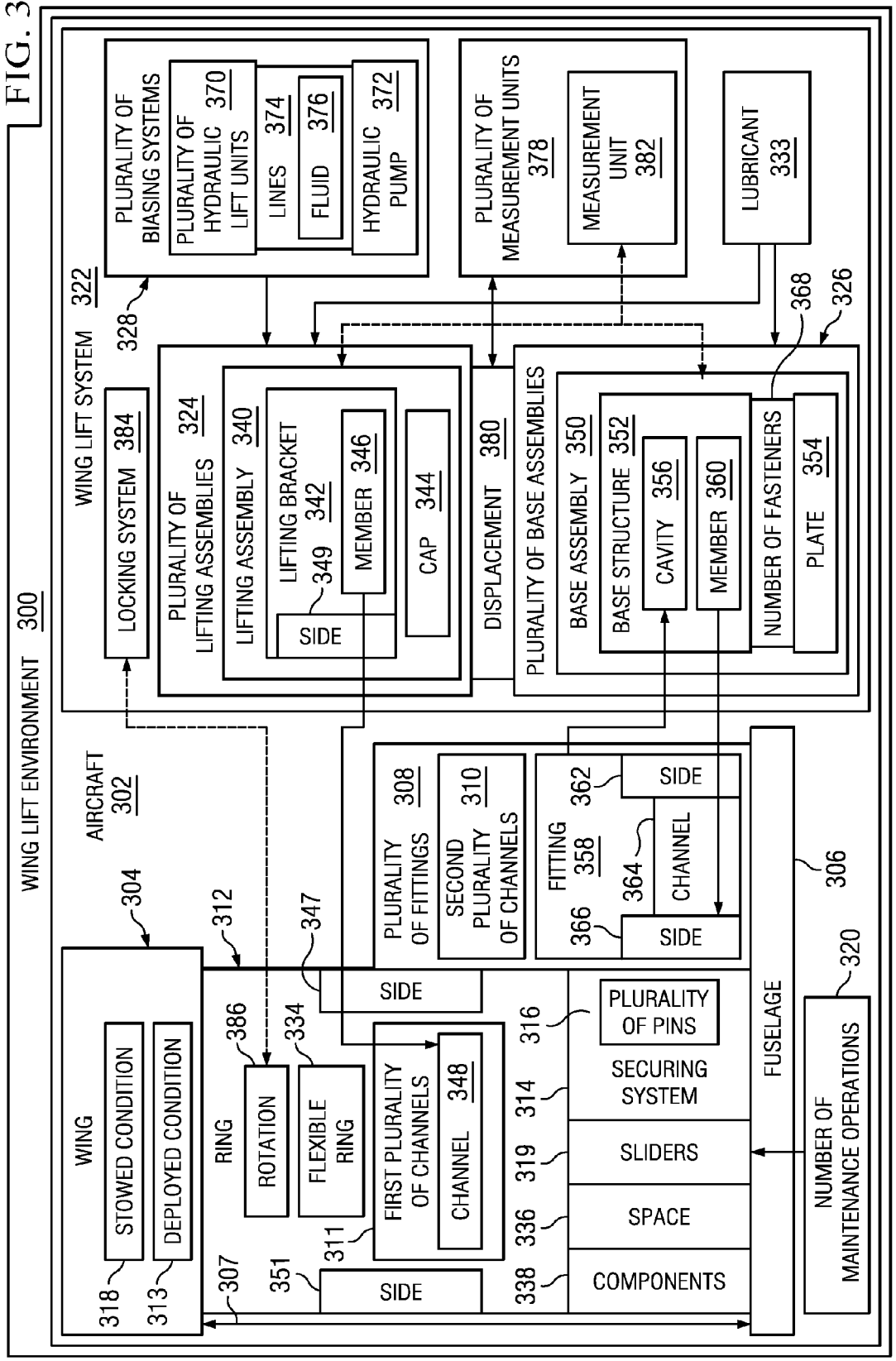

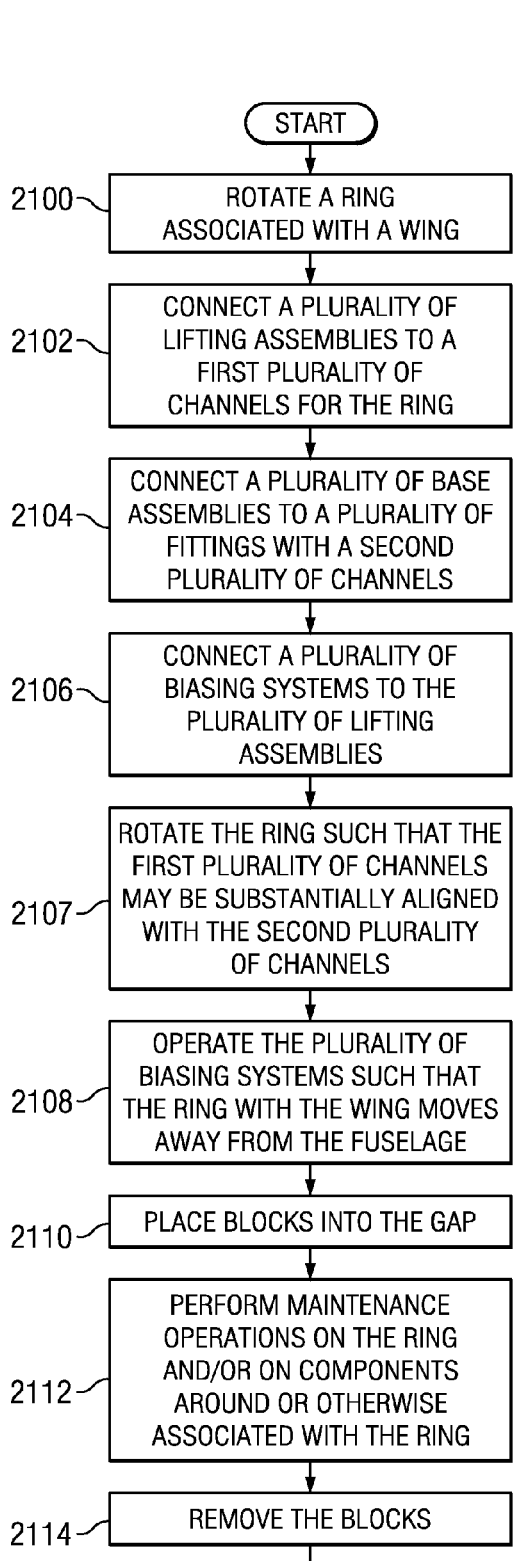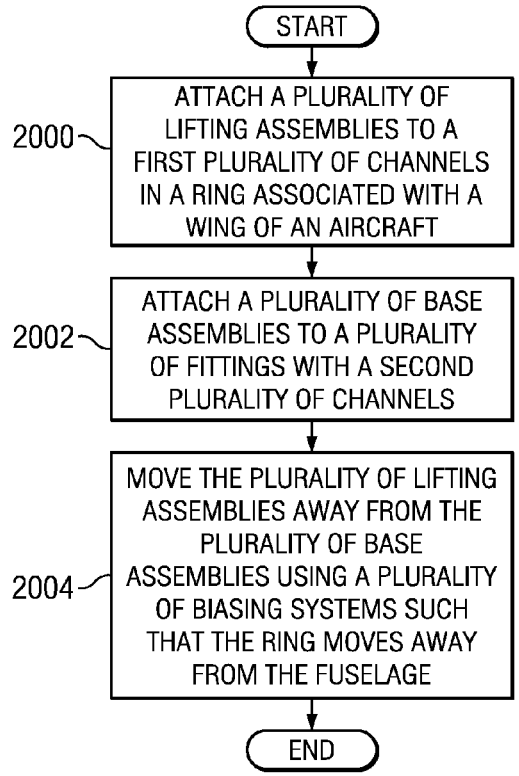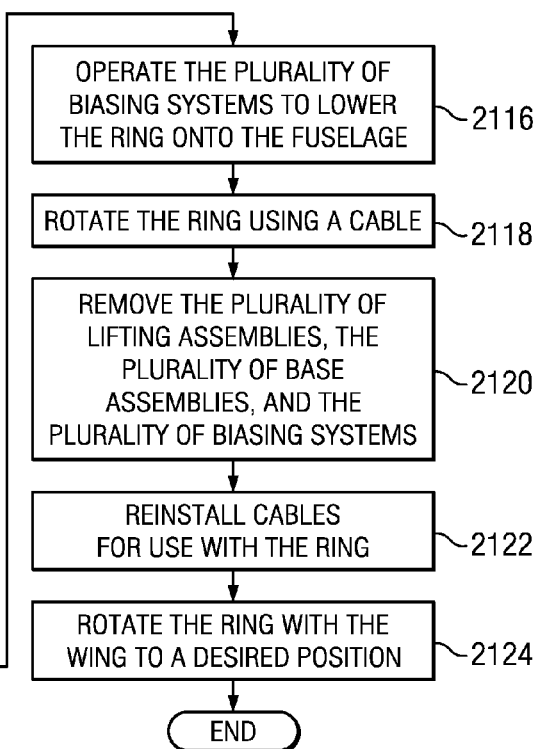
FIG. 20
FIG. 21

WING LIFT SYSTEM CAPABILITY EXPANSION

GOVERNMENT LICENSE RIGHTS

This application was made with Government support under contract number N00019-09-0008 awarded by the United States Navy. The Government has certain rights in this application.

BACKGROUND INFORMATION

1. Field

The present disclosure relates generally to aircraft and, in particular, to non-fixed wing aircraft. Still more particularly, the present disclosure relates to a method and apparatus for lifting a wing for a non-fixed wing aircraft.

2. Background

Aircraft may take many different forms. For example, without limitation, aircraft may take the form of a fixed or non-fixed wing aircraft or a helicopter. A fixed wing aircraft also may be referred to as an airplane. Fixed wing aircraft typically may require more room to take off and land, as compared to a helicopter.

Some aircraft may provide for vertical takeoff and landing. For example, without limitation, a Harrier jump jet may be an example of a jet-powered aircraft that may perform vertical takeoffs and landings.

Another example may be a tilt-rotor aircraft. The rotors may move between a substantially horizontal position and a substantially vertical position. Still another example may be a tilt-wing aircraft.

In this manner, these types of aircraft may provide more flexibility, as compared to regular aircraft. For example, without limitation, with a vertical takeoff and landing capability, a tilt-rotor aircraft may require less room to take off and land, as compared to a normal fixed wing aircraft. Additionally, a tilt-rotor aircraft may provide longer ranges and higher speeds, as compared to a conventional helicopter.

Further, some tilt-rotor aircraft may be configured such that the wing is fixed during flight but may be rotated in non-flight conditions. For example, without limitation, the wing may be rotated to be substantially parallel with the fuselage of the aircraft. In this manner, less room may be required to store and transport this type of aircraft. With this type of capability, a tilt-rotor aircraft may be used on ships, such as aircraft carriers.

With these types of features, the association of the wing with the fuselage in a manner that allows for rotation may increase the complexity of the aircraft. This increased complexity may require increased maintenance and may take the aircraft out of service for longer time than desired.

Therefore, it would be advantageous to have a method and apparatus that takes into account at least one of the issues discussed above, as well as possibly other issues.

SUMMARY

In one advantageous embodiment, an apparatus may comprise a plurality of lifting assemblies, a plurality of base assemblies, and a plurality of biasing systems. The plurality of lifting assemblies may be configured to be attached to a first plurality of channels in a ring associated with a wing of an aircraft. The plurality of base assemblies may be configured to be attached to a plurality of fittings with a second plurality of channels associated with a fuselage of the aircraft. The plurality of biasing systems may be configured to move the plurality of lifting assemblies away from the plurality of base assemblies such that the ring moves away from the fuselage.

In another advantageous embodiment, a lifting system to lift a rotatable wing away from a fuselage of an aircraft may comprise a plurality of lifting assemblies, a plurality of base assemblies, a plurality of hydraulic lift units, a hydraulic pump, a plurality of measurement units, and a locking system. The plurality of lifting assemblies may be configured to be attached to a first plurality of channels in a ring associated with a rotatable wing of the aircraft. A lifting assembly in the plurality of lifting assemblies may comprise a lifting bracket having a member configured to extend through a channel in the first plurality of channels and a cap configured to engage the member to secure the lifting bracket to the channel in the ring. The plurality of base assemblies may be configured to be attached to a plurality of fittings with a second plurality of channels associated with the fuselage of the aircraft. A base assembly in the plurality of base assemblies may comprise a base structure having a cavity configured to receive a fitting in the plurality of fittings and a plate configured to connect the plate to the base structure. The plurality of hydraulic lift units may be configured to move the plurality of lifting assemblies away from the plurality of base assemblies such that the ring moves away from the fuselage. The hydraulic pump may be configured to be attached to the plurality of hydraulic lift units and to send fluid into the plurality of hydraulic lift units to move the plurality of lifting assemblies away from the plurality of base assemblies such that the ring may move away from the fuselage. The plurality of measurement units may be configured to measure a displacement between the plurality of lifting assemblies and the plurality of base assemblies. The locking system may be configured to reduce a rotation of the ring while the plurality of lifting assemblies is attached to the first plurality of channels in the ring associated with the rotatable wing of the aircraft. The plurality of base assemblies may be attached to the plurality of fittings with the second plurality of channels associated with the fuselage of the aircraft. The first plurality of channels may be aligned with the second plurality of channels. The locking system may comprise a plurality of pins configured to be placed through the first plurality of channels attached to the plurality of lifting assemblies corresponding to the second plurality of channels in the plurality of base assemblies.

In yet another advantageous embodiment, a method may be present for moving a wing. A plurality of lifting assemblies may be attached to a first plurality of channels in a ring associated with the wing of an aircraft. A plurality of base assemblies may be attached to a plurality of fittings with a second plurality of channels associated with a fuselage of the aircraft. The plurality of lifting assemblies may be moved away from the plurality of base assemblies using a plurality of biasing systems such that the ring may move away from the fuselage.

In still yet another advantageous embodiment, a method may be present for lifting a wing away from a fuselage of an aircraft using a wing lift system. A ring associated with the wing of the aircraft may be rotated to align a first plurality of channels in the ring with a second plurality of channels in a plurality of fittings associated with the fuselage of the aircraft. A plurality of lifting assemblies may be attached to the first plurality of channels in the ring associated with the wing of the aircraft while the first plurality of channels is unaligned with the second plurality of channels in the plurality of fittings associated with the fuselage of the aircraft. A lifting assembly in the plurality of lifting assemblies may comprise a lifting bracket having a member configured to extend through a channel in the first plurality of channels and a cap configured to engage the member to secure the lifting bracket to the channel in the ring. A plurality of base assemblies may be attached to the plurality of fittings with the second plurality of channels associated with the fuselage of the aircraft while the first plurality of channels is unaligned with the second plurality of channels in the plurality of fittings associated with the fuselage of the aircraft. A base assembly in the plurality of base assemblies may comprise a base structure having a cavity configured to receive a fitting in the plurality of fittings; a plate configured to be connected to the base structure such that the base assembly is connected to the fitting; and a number of fasteners configured to connect the plate to the base structure. The plurality of lifting assemblies may be moved away from the plurality of base assemblies using a plurality of hydraulic lift units such that the ring may move away from the fuselage. A hydraulic pump may be configured to be attached to the plurality of hydraulic lift units and to send fluid into the plurality of hydraulic lift units to move the plurality of lifting assemblies away from the plurality of base assemblies such that the ring may move away from the fuselage.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 3 is an illustration of a wing lift environment in accordance with an advantageous embodiment;

FIG. 20 is an illustration of a flowchart of a process for moving a wing in accordance with an advantageous embodiment;

FIG. 21 is an illustration of a flowchart for using a wing lift system in accordance with an advantageous embodiment;

DETAILED DESCRIPTION

Figure 1:
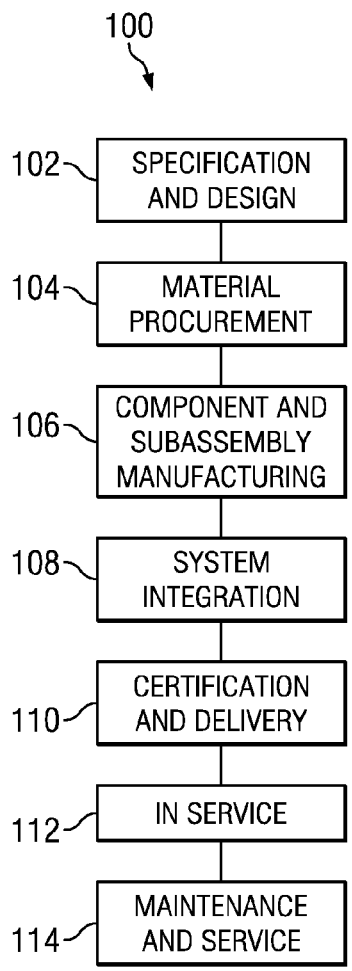
FIG. 1 is an illustration of an aircraft manufacturing and service method in accordance with an advantageous embodiment.
Figure 2:
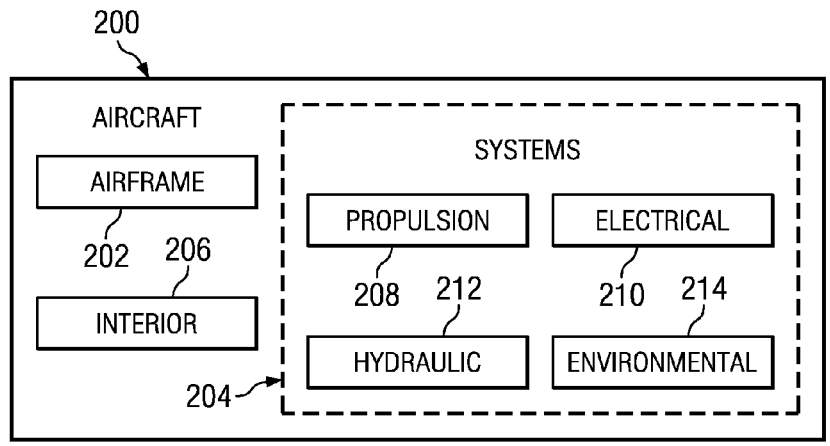
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and/or other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments are one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially reduce time and expense for maintenance and service 114 for aircraft 200.

The different advantageous embodiments may recognize and take into account a number of different considerations. For example, without limitation, the different advantageous embodiments recognize and take into account that a ring may be associated with the wing. This ring may be a flexible ring that may be associated with the fuselage in a moveable or rotatable manner. With this type of configuration, a number of attachment points may be present for attaching the ring to the aircraft in a fixed position during flight. These attachment points may take the form of a fitting. Additionally, a number of different structures may be present to allow the ring to slide relative to the fuselage to rotate the wing when the aircraft is in a non-flight condition.

The different advantageous embodiments may recognize and take into account that maintenance may be required for this assembly from time to time. The different advantageous embodiments may recognize and take into account that currently, the maintenance may require disconnecting, cutting, or otherwise separating components extending between the fuselage and the wing. These components may include, for example, without limitation, wires, hydraulic lines, pneumatic lines, air ducts, and other components. After these components have been disconnected or removed, the wing may be removed from the aircraft by a crane or other support equipment designed to lift the wing.

Further, this operation may require a number of technicians and/or engineers to perform the maintenance. The different advantageous embodiments recognize and take into account that this type of maintenance may require about three weeks or more to perform and return the aircraft into service condition.

Thus, the different advantageous embodiments recognize and take into account one or more of the considerations discussed above, as well as possibly other considerations, and provide a method and apparatus for moving a wing to perform maintenance on an aircraft. In one or more of the advantageous embodiments, an apparatus may comprise a plurality of lifting assemblies, a plurality of base assemblies, and a plurality of biasing systems. Each lifting assembly in the plurality of lifting assemblies may be configured to be attached to a channel in a plurality of channels and a ring associated with a wing of the aircraft.

Each base assembly in the plurality of base assemblies may be configured to be attached to a fitting with a channel in a plurality of fittings with a plurality of channels associated with the fuselage of the aircraft. Each biasing system within the plurality of biasing systems may be configured to move an associated lifting assembly in the plurality of lifting assemblies away from an associated base assembly in the plurality of base assemblies such that the ring may move away from the fuselage.

With reference now to FIG. 3, an illustration of a wing lift environment is depicted in accordance with an advantageous embodiment. Wing lift environment 300 may be an example of a wing lift environment that may be used during aircraft manufacturing and service method 100 in FIG. 1. In these illustrative examples, aircraft 302 may have wing 304 and fuselage 306. Aircraft 302 may be an example of one implementation for aircraft 200 in FIG. 2. Wing 304 and fuselage 306 may be examples of components in airframe 202 in FIG. 2. In this illustrative example, wing 304 may be associated with fuselage 306 in a manner such that wing 304 may rotate about vertical axis 307 through fuselage 306.

In these examples, plurality of fittings 308 with second plurality of channels 310 may be associated with fuselage 306. In these examples, first plurality of channels 311 in ring 312 may be aligned with second plurality of channels 310 in plurality of fittings 308 when wing 304 is in deployed condition 313. In this condition, securing system 314 may move plurality of pins 316 into first plurality of channels 311 aligned with second plurality of channels 310. When plurality of pins 316 is removed from first plurality of channels 311 and second plurality of channels 310, wing 304 may be rotated to place wing 304 in stowed condition 318.

Sliders 319 may be present in aircraft 302. Sliders 319 may be associated with fuselage 306 and may allow ring 312 to slide with less friction. After use over a period of time, number of maintenance operations 320 may be performed to recondition, replace, and/or otherwise perform maintenance on sliders 319. In some illustrative examples, sliders 319 may be lost or may become unusable for wing 304. This loss of sliders 319 may cause wing 304 to not lock in a desired manner. Further, the loss of sliders 319 may cause movement of ring 312. Movement of ring 312 may cause undesired characteristics on wing 304, fuselage 306, and/or plurality of fittings 308. Number of maintenance operations 320 may need to be performed to rework and/or recondition these undesired characteristics.

In some instances, number of maintenance operations 320 may be performed on wing 304 and/or fuselage 306 that may require separation of wing 304 from fuselage 306. In these situations, wing lift system 322 may be used to lift wing 304 relative to fuselage 306. In other words, wing lift system 322 may lift wing 304 away from fuselage 306.

In this illustrative example, wing lift system 322 may comprise plurality of lifting assemblies 324, plurality of base assemblies 326, and plurality of biasing systems 328. Plurality of lifting assemblies 324 may be configured to be attached to first plurality of channels 311 in ring 312 associated with wing 304 of aircraft 302. Ring 312, in these examples, may be flexible ring 334. Ring 312 may be made of various materials, such as, for example, without limitation, steel, titanium, metal alloys, and/or some other suitable materials. Plurality of base assemblies 326 may be configured to be attached to plurality of fittings 308 with second plurality of channels 310.

In these different advantageous embodiments, plurality of biasing systems 328 may move plurality of lifting assemblies 324 away from plurality of base assemblies 326. This movement may occur while wing 304 is in deployed condition 313. In this manner, flexible ring 334 may move away from fuselage 306. This movement may create space 336 between flexible ring 334 and fuselage 306. In this manner, number of maintenance operations 320 may be performed without disconnecting components 338 between wing 304 and fuselage 306.

In these illustrative examples, lifting assembly 340 may be an example of a lifting assembly within plurality of lifting assemblies 324. Lifting assembly 340 may comprise lifting bracket 342 and cap 344. Lifting bracket 342 may have member 346, which may be configured to extend through side 349 of lifting bracket 342 into channel 348 in first plurality of channels 311 on side 347 of ring 312. Cap 344 may be configured to engage member 346 on side 351 of ring 312 to secure lifting bracket 342 to channel 348 in ring 312. In these illustrative examples, side 347 may be opposite to side 349 of lifting bracket 342.

Base assembly 350 may be an example of a base assembly within plurality of base assemblies 326. Base assembly 350 may comprise base structure 352 and plate 354. Base structure 352 may have cavity 356 configured to receive fitting 358 in plurality of fittings 308. Base structure 352 also may have member 360. Member 360 may extend from side 362 of fitting 358 through channel 364 to side 366 of fitting 358. Plate 354 may be configured to be connected to base structure 352 such that base assembly 350 may be connected to fitting 358. Plate 354 may be located on side 366, while base structure 352 may be located on side 362. Further, the connection of plate 354 to base structure 352 may be made using number of fasteners 368.

In these illustrative examples, plurality of biasing systems 328 may comprise plurality of hydraulic lift units 370. Additionally, wing lift system 322 also may include hydraulic pump 372. Hydraulic pump 372 may be configured to be attached to plurality of hydraulic lift units 370 by lines 374. Hydraulic pump 372 may be configured to send fluid 376 into plurality of hydraulic lift units 370 to move plurality of lifting assemblies 324 away from plurality of base assemblies 326 such that ring 312 moves away from fuselage 306.

Plurality of lifting assemblies 324 and plurality of base assemblies 326 may be comprised of a number of different materials. For example, without limitation, plurality of lifting assemblies 324 and plurality of base assemblies 326 may be comprised of at least one of steel, titanium, a metal alloy, a carbide metal, and/or some other suitable material. The material selected may be one configured to withstand the forces that may occur when lifting wing 304 away from fuselage 306. In some advantageous embodiments, lubricant 333 may be used with plurality of lifting assemblies 324 and/or plurality of base assemblies 326. Lubricant 333 may be applied to the surfaces of plurality of lifting assemblies 324 and/or the surfaces of plurality of base assemblies 326 in which the surfaces may slide against other surfaces. Lubricant 333 may take the form of a baked-on dry film lubricant in these examples.

Additionally, in some advantageous embodiments, plurality of measurement units 378 may be used. Plurality of measurement units 378 measures displacement 380 between plurality of lifting assemblies 324 and plurality of base assemblies 326. For example, without limitation, measurement unit 382 may be an example of a measurement unit within plurality of measurement units 378. Measurement unit 382 may be associated with lifting assembly 340 and base assembly 350 in a manner that allows measurement unit 382 to measure displacement 380 between lifting assembly 340 and base assembly 350.

Further, wing lift system 322 also may include locking system 384. Locking system 384 may be configured to reduce and/or eliminate rotation 386 of ring 312. Rotation 386 may be reduced and/or eliminated, while plurality of lifting assemblies 324 may be attached to first plurality of channels 311 in ring 312 associated with wing 304. Plurality of base assemblies 326 may be attached to plurality of fittings 308 with second plurality of channels 310, and first plurality of channels 311 may be aligned with second plurality of channels 310.

The illustration of wing lift environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, plurality of measurement units 378 and/or locking system 384 may be omitted. In yet other advantageous embodiments, plurality of biasing systems 328 may be associated or integrated as part of plurality of lifting assemblies 324 and/or plurality of base assemblies 326.

As another example, components other than sliders 319 may be examples of components for which number of maintenance operations 320 may be performed.

Figure 4:
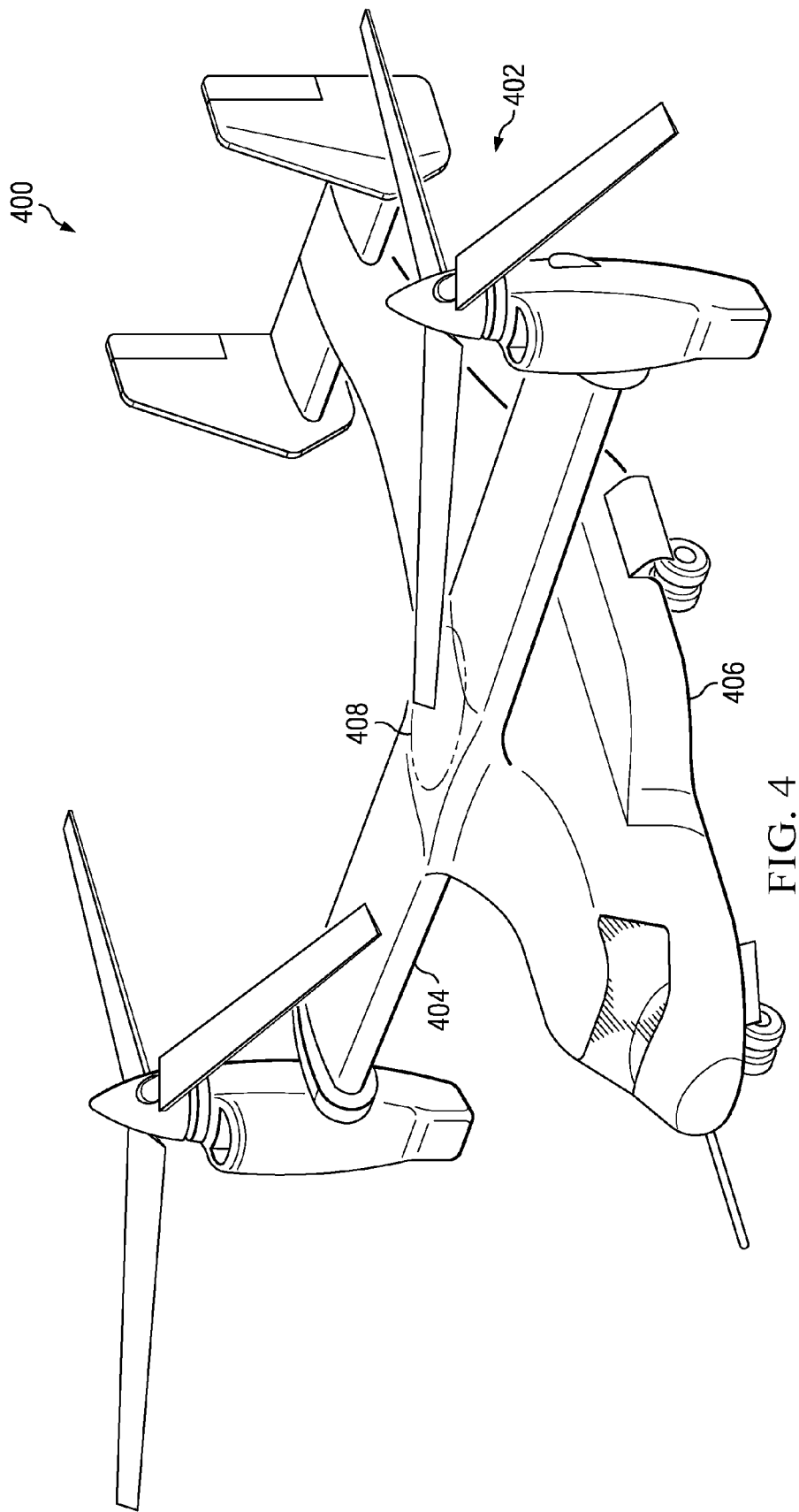
FIG. 4 is an illustration of an aircraft in accordance with an advantageous embodiment.

With reference now to FIG. 4, an illustration of an aircraft is depicted in accordance with an advantageous embodiment. In this illustrative example, aircraft 400 may be an example of one implementation for aircraft 200 in FIG. 2 and aircraft 302 in FIG. 3. Aircraft 400 may be tilt-rotor aircraft 402 in these illustrative examples.

As illustrated, wing 404 may be attached to fuselage 406. Wing 404 may be fixed during flight. Additionally, wing 404 may rotate using rotation system 408, in these illustrative examples, during non-flight conditions.

Figure 5:
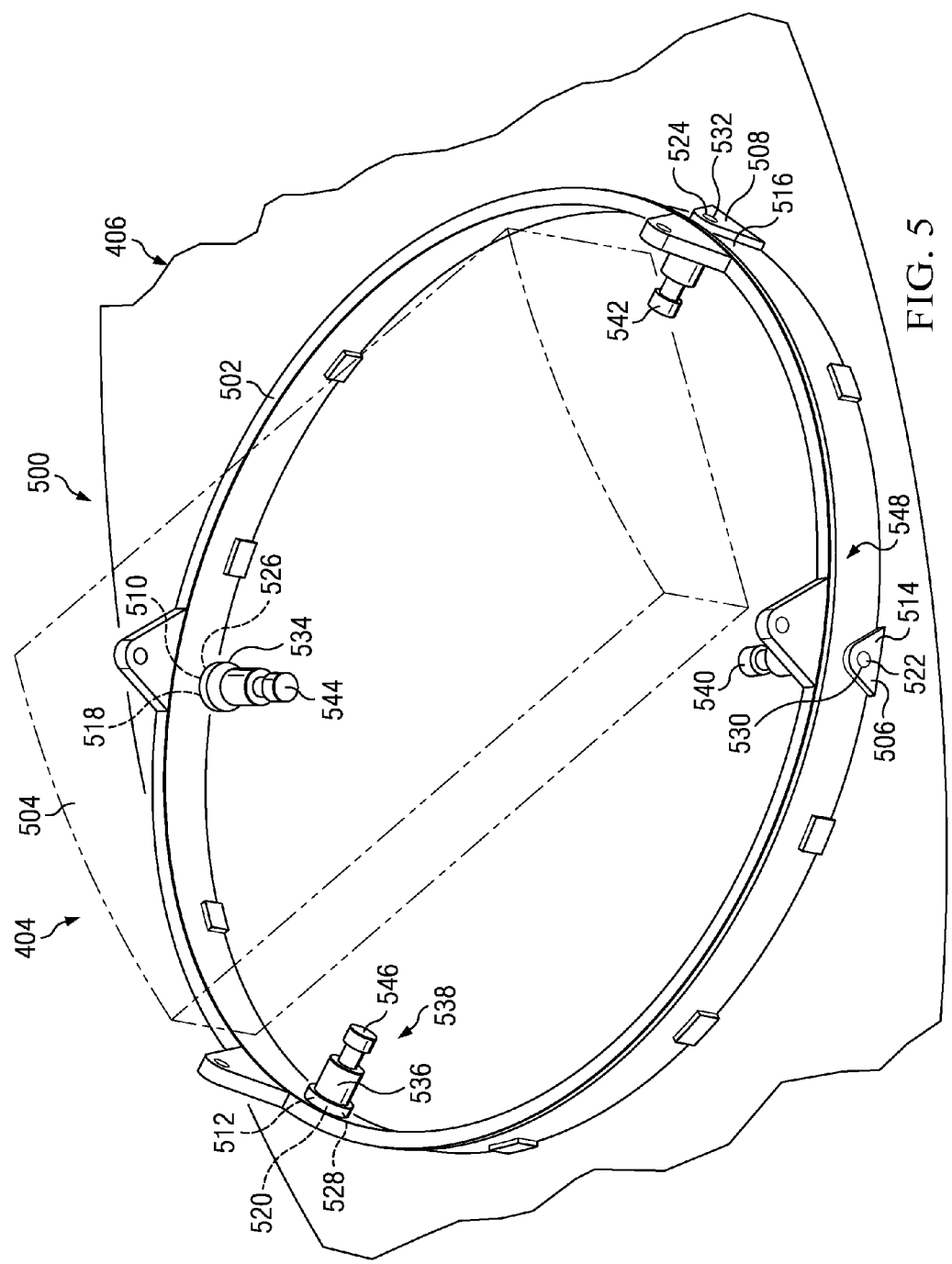
FIG. 5 is an illustration of a rotation system in accordance with an advantageous embodiment.

With reference now to FIG. 5, an illustration of a rotation system is depicted in accordance with an advantageous embodiment. In this illustrative example, rotation system 500 may be an example of one implementation of rotation system 408 in FIG. 4.

In these illustrative examples, ring 502 may be an example of one implementation of ring 312 in FIG. 3. Ring 502 may be associated with wing 404 in these examples. More specifically, ring 502 may be attached to wing box 504 for wing 404. In these illustrative examples, attachment points 506, 508, 510, and 512 may be present on fuselage 406. In these depicted examples, attachment points 506, 508, 510, and 512 take the form of fittings 514, 516, 518, and 520.

Channels 522, 524, 526, and 528 may be present in fittings 514, 516, 518, and 520, respectively. Each of these fittings may be aligned with channels 530, 532, 534, and 536 in ring 502. In some advantageous embodiments, fittings 514, 516, 518, and 520 may be associated with a number of retainers that guide and retain ring 502 while allowing ring 502 to rotate. These retainers may be removed when performing maintenance operations on ring 502.

When channels 522, 524, 526, and 528 are aligned with channels 530, 532, 534, and 536, securing system 538 may secure ring 502 to fuselage 406. In these examples, securing system 538 may comprise locking pins 540, 542, 544, and 546. In these illustrative examples, section 548 may be a section of rotation system 500 that may be described in more detail in FIGS. 10-13 below.

Figure 6:
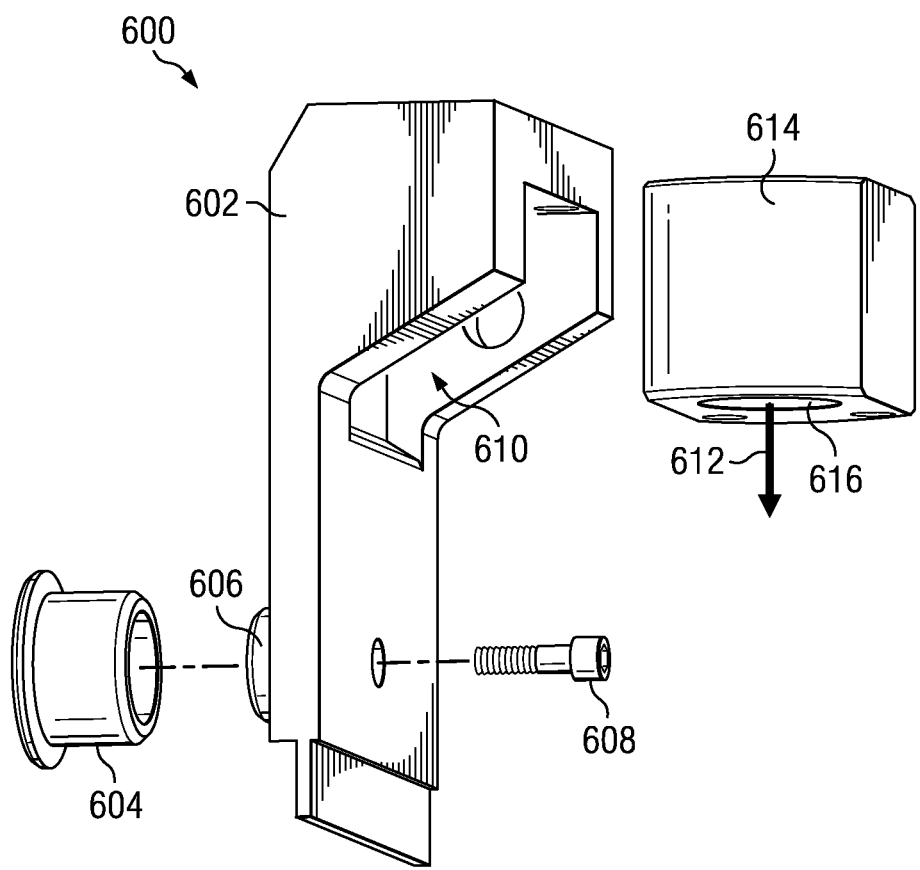
FIG. 6 is an illustration of a lifting assembly in accordance with an advantageous embodiment.

With reference now to FIG. 6, an illustration of a lifting assembly is depicted in accordance with an advantageous embodiment. In this illustrative example, lifting assembly 600 is shown in an exploded view. Lifting assembly 600 may be an example of one implementation for lifting assembly 340 in FIG. 3.

In this illustrative example, lifting assembly 600 may comprise lifting bracket 602, cap 604, member 606, and fastener 608. Lifting bracket 602 may be configured for attachment to ring 502 in FIG. 5 at channel 530. In these illustrative examples, member 606 may be configured to extend into channel 530 in FIG. 5. In some advantageous embodiments, member 606 may be a post. Cap 604 may secure lifting bracket 602 with member 606 in channel 530. Fastener 608 may secure cap 604 to lifting bracket 602 in these illustrative examples. Fastener 608 may secure cap 604 to lifting bracket 602 such that ring 502 in FIG. 5 may be secured in between lifting bracket 602 and cap 604.

In this illustrative example, lifting bracket 602 may have cavity 610. Cavity 610 may be configured to receive and hold biasing unit 614. Biasing unit 614 may have piston 616, which may extend in the direction of arrow 612.

Figure 7:
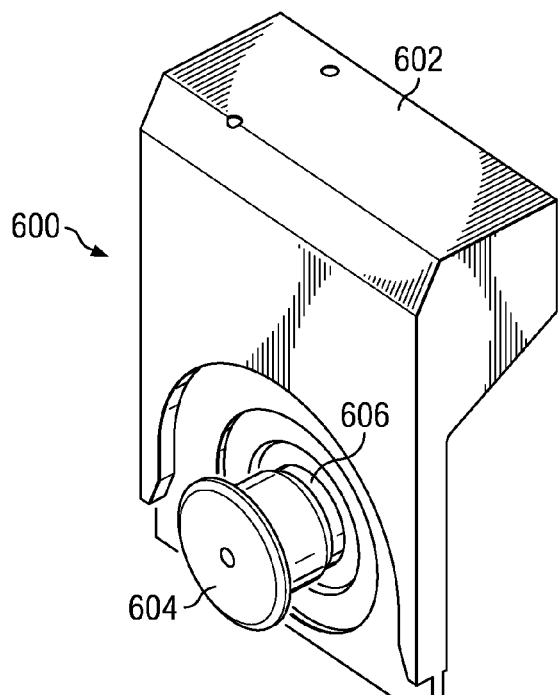
FIG. 7 is an illustration of an assembled view of a lifting assembly in accordance with an advantageous embodiment.

Turning now to FIG. 7, an illustration of an assembled view of lifting assembly 600 in FIG. 6 is depicted in accordance with an advantageous embodiment. In other illustrative examples, lifting bracket 602 and cap 604 may be secured with ring 502 in FIG. 5 between lifting bracket 602 and cap 604.

Figure 8:
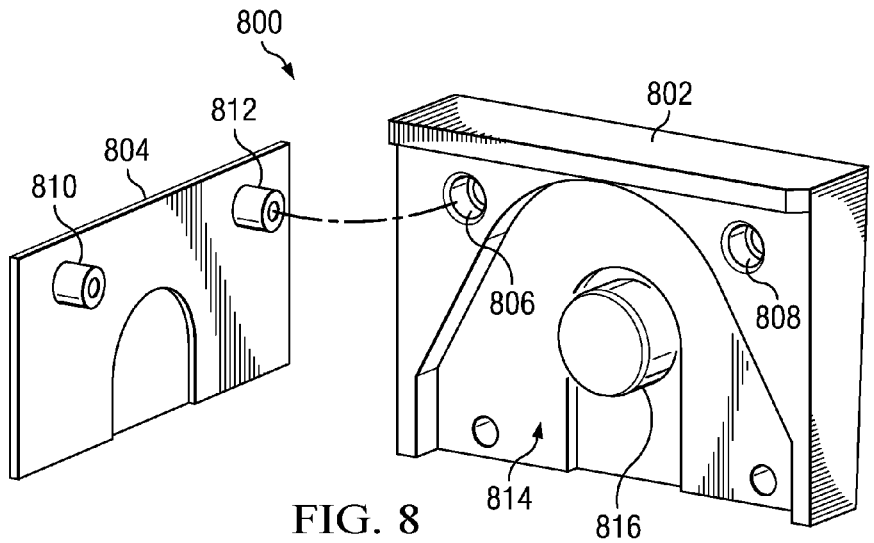
FIG. 8 is an illustration of a base assembly in accordance with an advantageous embodiment.

Turning now to FIG. 8, an illustration of a base assembly is depicted in accordance with an advantageous embodiment. Base assembly 800 is shown in an unassembled view in this figure. Base assembly 800 is an example of one implementation for base assembly 350 in FIG. 3.

As illustrated, base assembly 800 may comprise base structure 802 and plate 804. Plate 804 may be configured to be secured to base structure 802. In these illustrative examples, base structure 802 may have channel 806 and channel 808. Members 810 and 812 on plate 804 may be configured to be placed into channels 806 and 808, respectively. Fasteners (not shown) may then be used to secure plate 804 to base assembly 800.

Base assembly 800, in this example, may have cavity 814. Cavity 814 may be configured to receive a fitting, such as fitting 514 in FIG. 5. In this example, member 816 within cavity 814 may extend into channel 522 in FIG. 5 for fitting 514. Member 816 also may take the form of a post.

Figure 9:
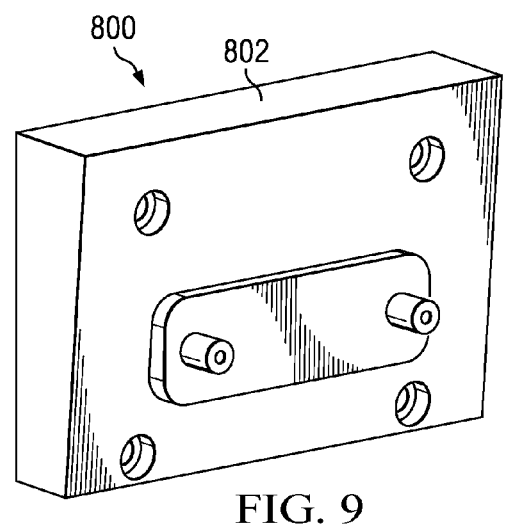
FIG. 9 is an illustration of an assembled view of a base assembly in accordance with an advantageous embodiment.

In FIG. 9, an illustration of an assembled view of a base assembly is depicted in accordance with an advantageous embodiment.

Figure 10:
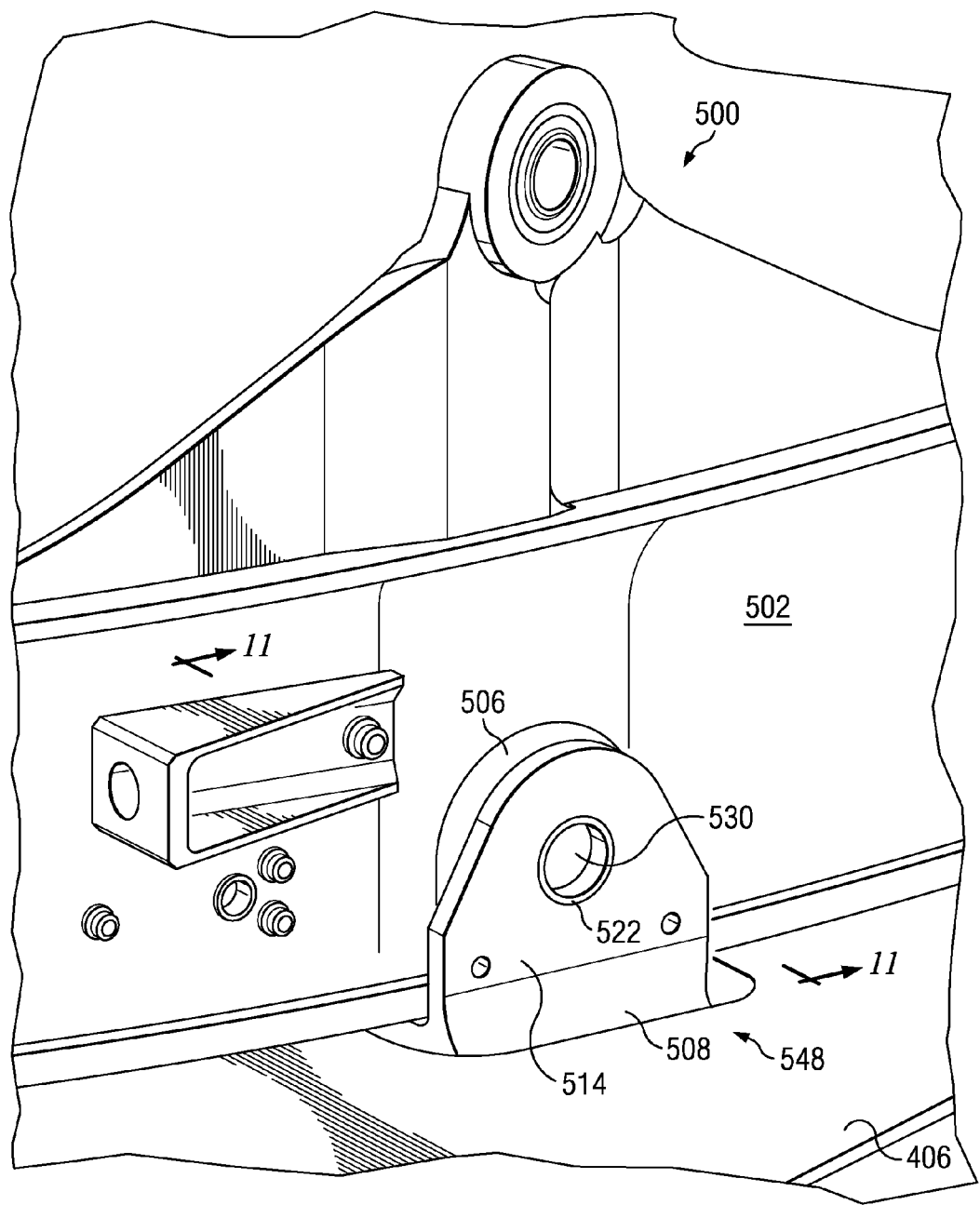
FIG. 10 is an illustration of a more detailed view of a portion of a rotation system in accordance with an advantageous embodiment.

With reference now to FIG. 10, an illustration of a more detailed view of a portion of rotation system 500 in FIG. 5 is depicted in accordance with an advantageous embodiment. In this illustrative example, a more detailed view of section 548 in FIG. 5 is illustrated. In this view, channel 522 in fitting 514 may be aligned with channel 530 in ring 502.

Figure 11:
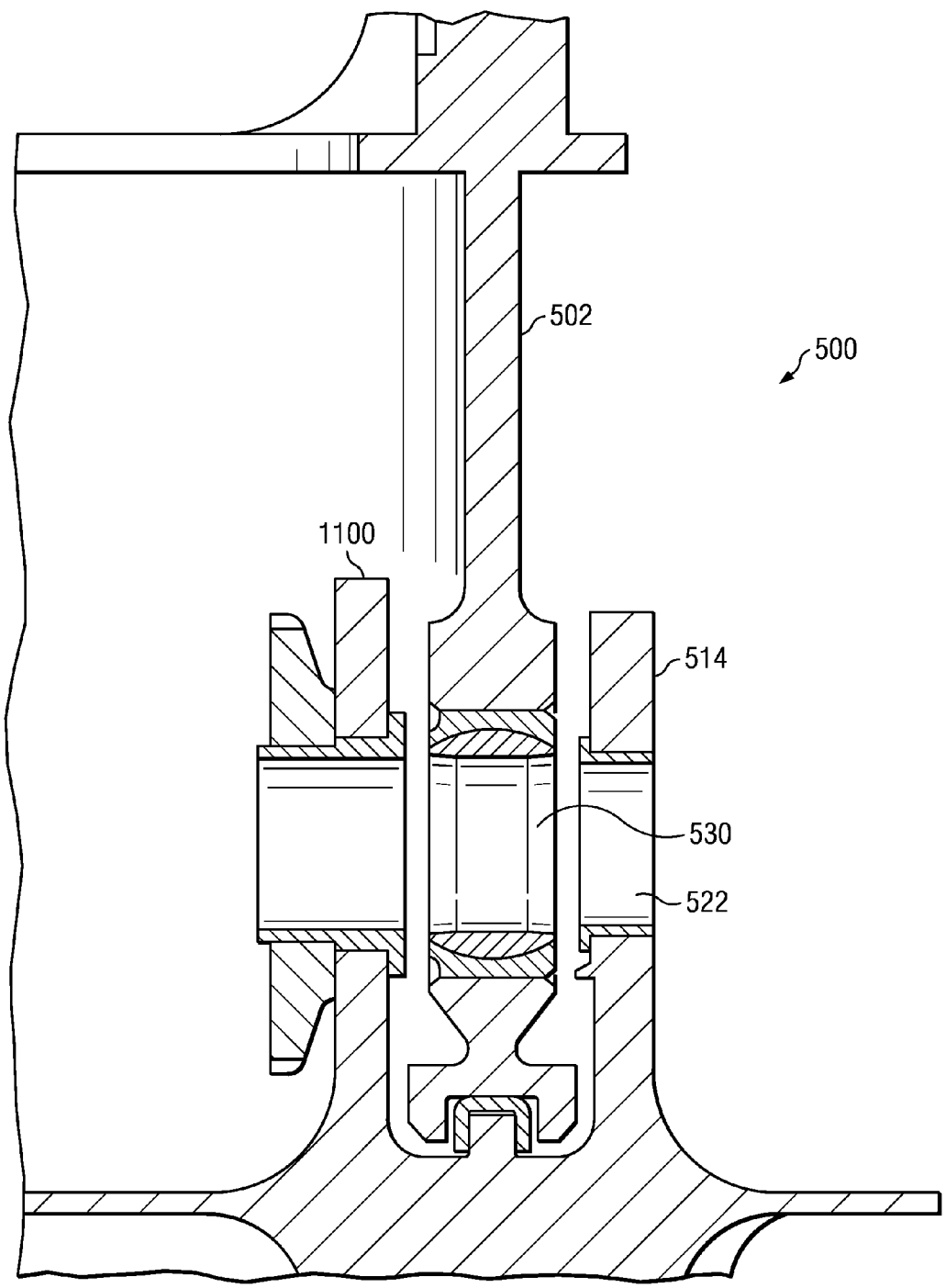
FIG. 11 is an illustration of a cross-sectional view of a portion of a ring in accordance with an advantageous embodiment.

In FIG. 11, an illustration of a cross-sectional view of a portion of a ring is depicted in accordance with an advantageous embodiment. In this illustrative example, a portion of ring 502 and fitting 514 is depicted taken along lines 11-11 in FIG. 10. In this view, fitting 1100 also may be seen in addition to fitting 514. Fitting 1100 may be associated with fuselage 406 in FIG. 4.

Figure 12:
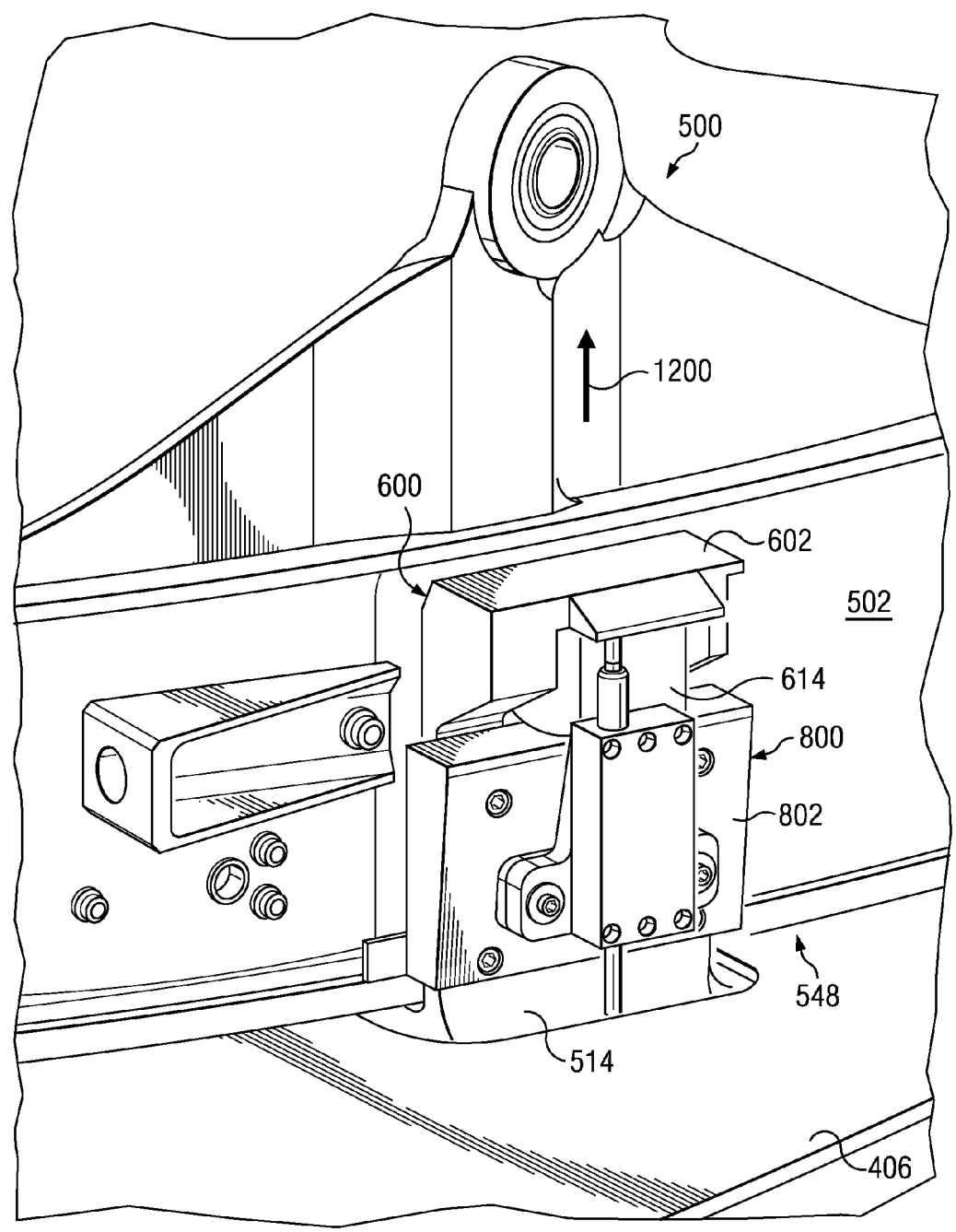
FIG. 12 is an illustration of a portion of a wing lift system in accordance with an advantageous embodiment.

With reference now to FIG. 12, an illustration of a portion of a wing lift system is depicted in accordance with an advantageous embodiment. In this view, lifting assembly 600 may be secured to ring 502, while base assembly 800 may be secured to fitting 514, which is hidden by biasing unit 614 in this view. As can be seen in this view, biasing unit 614 may be in place in a manner such that operation of biasing unit 614 may move lifting bracket 602 in the direction of arrow 1200. In this manner, ring 502 may be moved away from fuselage 406 and associated fitting 514.

Figure 13:
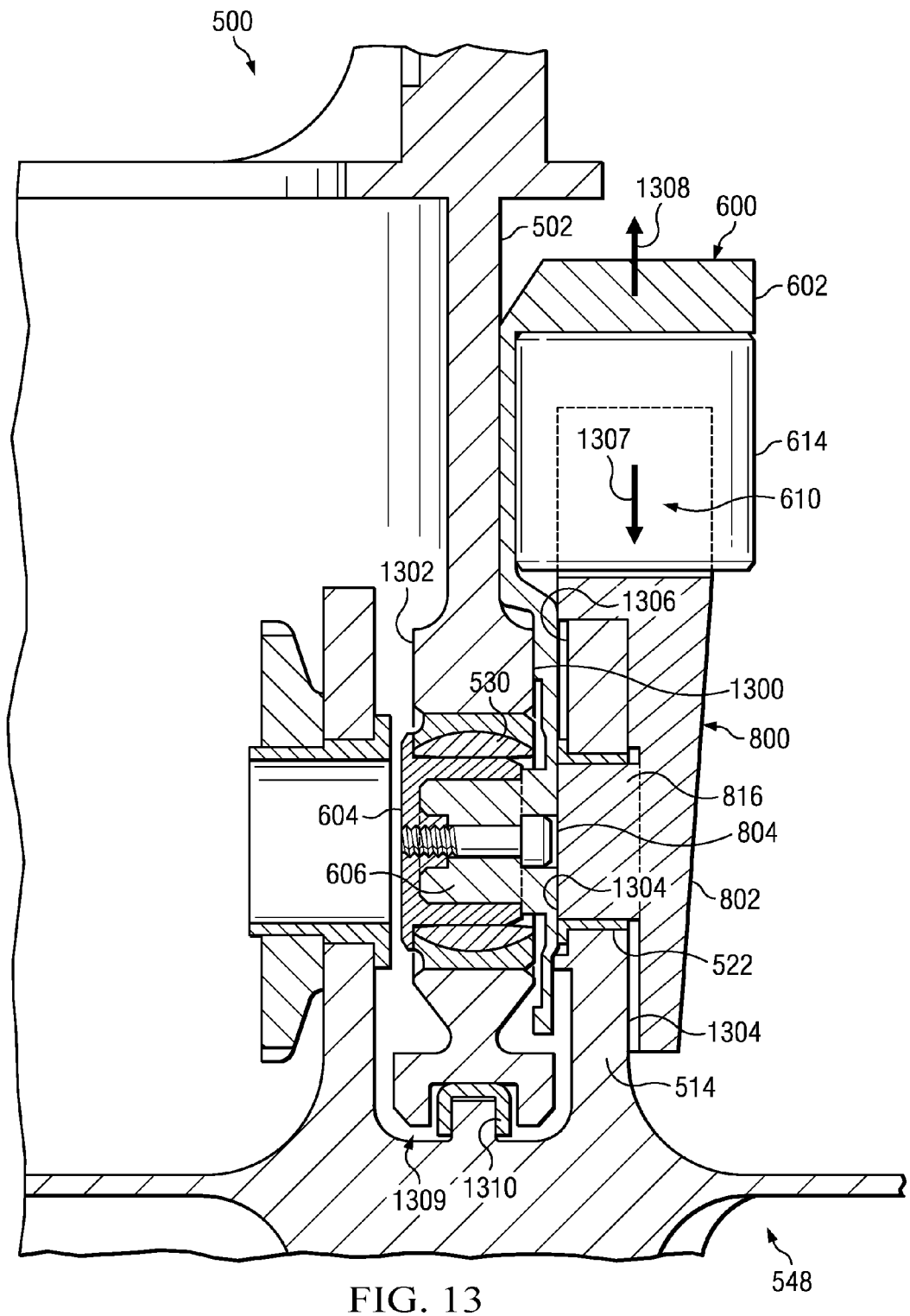
FIG. 13 is an illustration of a cross-sectional view of a ring and fitting with a portion of a wing lift system in accordance with an advantageous embodiment.

With reference next to FIG. 13, an illustration of a cross-sectional view of a ring and fitting with a portion of a wing lift system is depicted in accordance with an advantageous embodiment. In this view, a cross-sectional view of ring 502 and fitting 514, which is positioned under biasing unit 614 in this view, is depicted with lifting assembly 600, base assembly 800, and biasing unit 614 in place.

In this illustrative example, member 606 may extend from lifting bracket 602 in lifting assembly 600 on side 1300 of ring 502 through channel 530. Cap 604 may engage member 606 on side 1302 of ring 502. Member 816 may extend into channel 522 on side 1304 of fitting 514. Plate 804 may be located on side 1306 of fitting 514 and may be secured to base structure 802.

Biasing unit 614 may be located within cavity 610. Biasing unit 614 may apply force in the direction of arrow 1307. This force may cause lifting bracket 602 to move in the opposite direction of arrow 1307 in the direction of arrow 1308. This movement of lifting bracket 602 may cause ring 502 to move in the direction of arrow 1308 away from fuselage 406. This movement may increase the size of space 1309, which may allow for maintenance to be performed. For example, maintenance may be performed on slider 1310. More specifically, slider 1310 may be replaced if space 1309 is increased by using lifting assembly 600, base assembly 800, and biasing unit 614.

The different advantageous embodiments recognize that jacking methods for lifting ring 502 may not be used to increase the size of space 1309. Typical jacking methods may require space for a jack to be positioned under ring 502 and a reacting surface for the jack to push against. In these illustrative examples, ring 502 may not have enough space for the jack to be positioned under ring 502. Further, the jack may not have a reacting surface to push against to lift ring 502. For example, without limitation, the surface of fuselage 406 may not have a desired hardness to function as a reacting surface for the jack. In these different advantageous embodiments, lifting assembly 600, base assembly 800, and biasing unit 614 may be used to lift ring 502 without needing additional space under ring 502 and/or a reacting surface.

Figure 14:
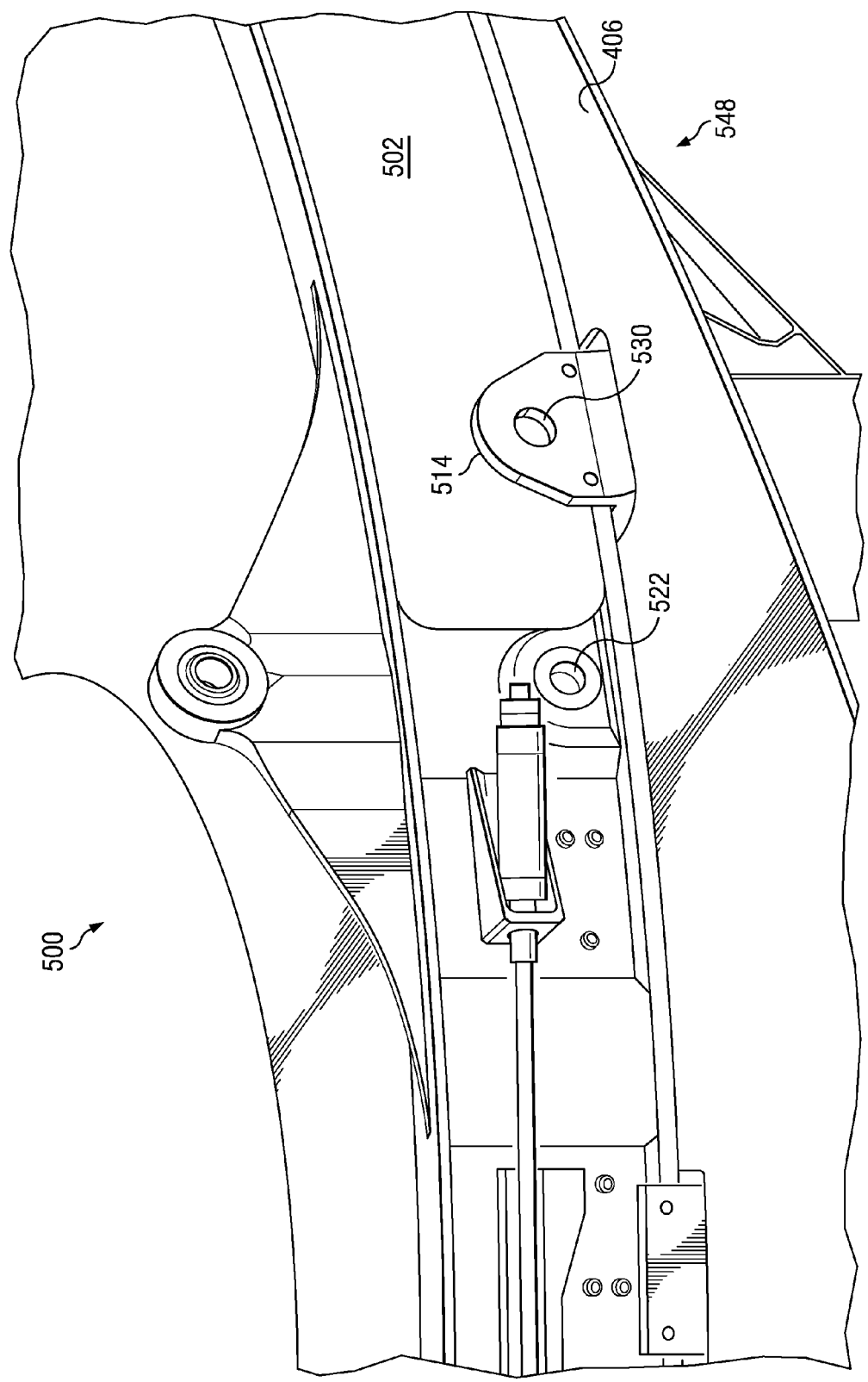
FIG. 14 is an illustration of steps involved in installing and operating a wing lift system in accordance with an advantageous embodiment.

Turning to FIGS. 14-19, illustrations of steps involved in installing and operating a wing lift system are depicted in accordance with an advantageous embodiment. Turning first to FIG. 14, in this illustrative example, ring 502 may be rotated such that channel 530 and channel 522 may be unaligned.

Figure 15:
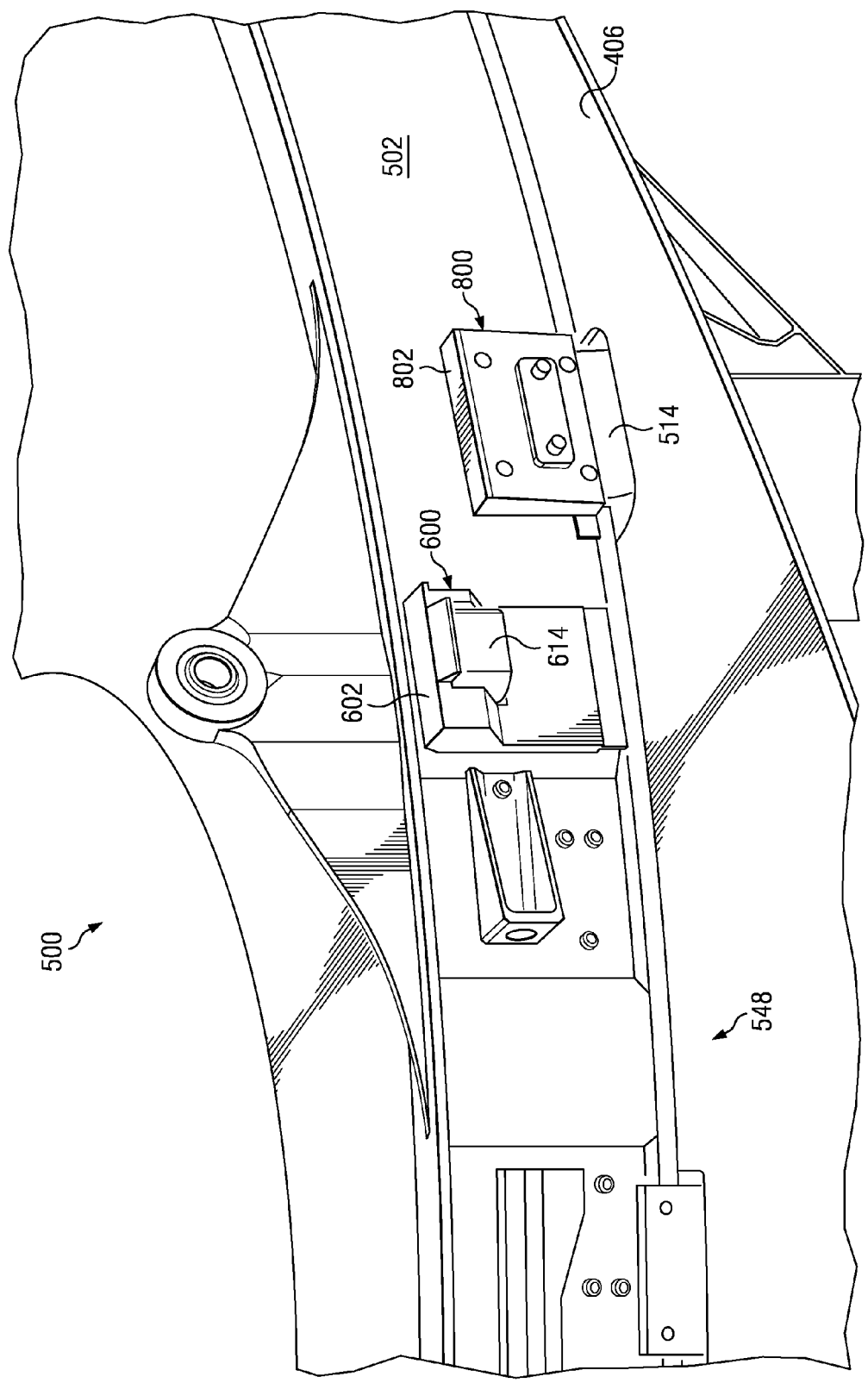
FIG. 15 is an illustration of installation of components for a wing lift system in accordance with an advantageous embodiment.

In FIG. 15, an illustration of installation of components for a wing lift system is depicted in accordance with an advantageous embodiment. In this example, lifting assembly 600 may be attached to channel 522 in FIG. 5, hidden in this view by lifting assembly 600, in ring 502. Base assembly 800 may be attached to fitting 514.

Figure 16:
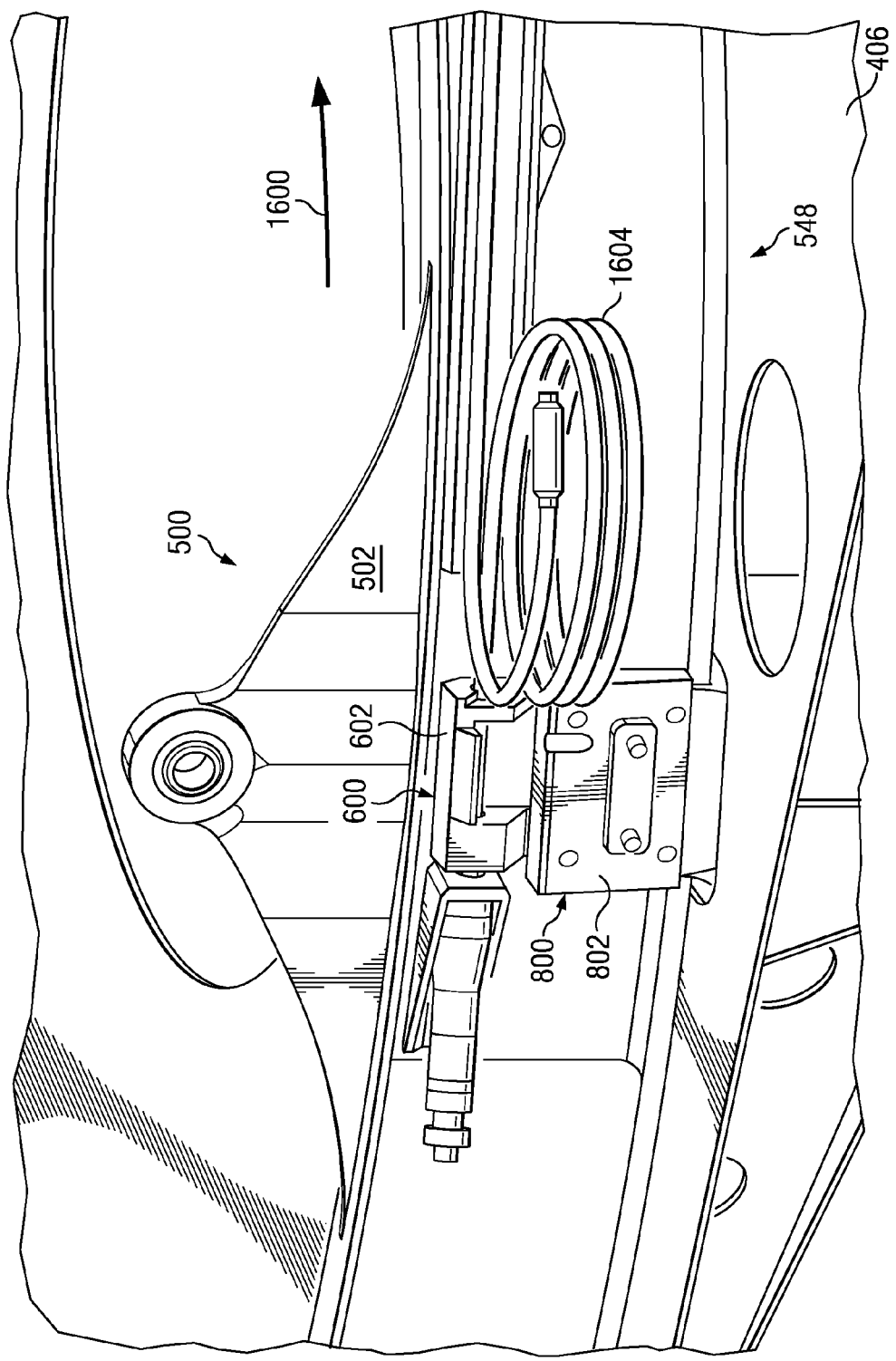
FIG. 16 is an illustration of steps involved in installing and operating a wing lift system in accordance with an advantageous embodiment.

With reference next to FIG. 16, ring 502 may be rotated in the direction of arrow 1600 such that channel 530 (not shown in this view) and channel 522 (also not shown in this view) may be aligned. In this manner, lifting assembly 600 and base assembly 800 may be aligned with each other.

In some advantageous embodiments, cable 1604 may be placed through lifting assembly 600. Cable 1604 may be part of rotation system 500 used to rotate ring 502. Further, cable 1604 may be used to align lifting assembly 600 and base assembly 800.

Figure 17:
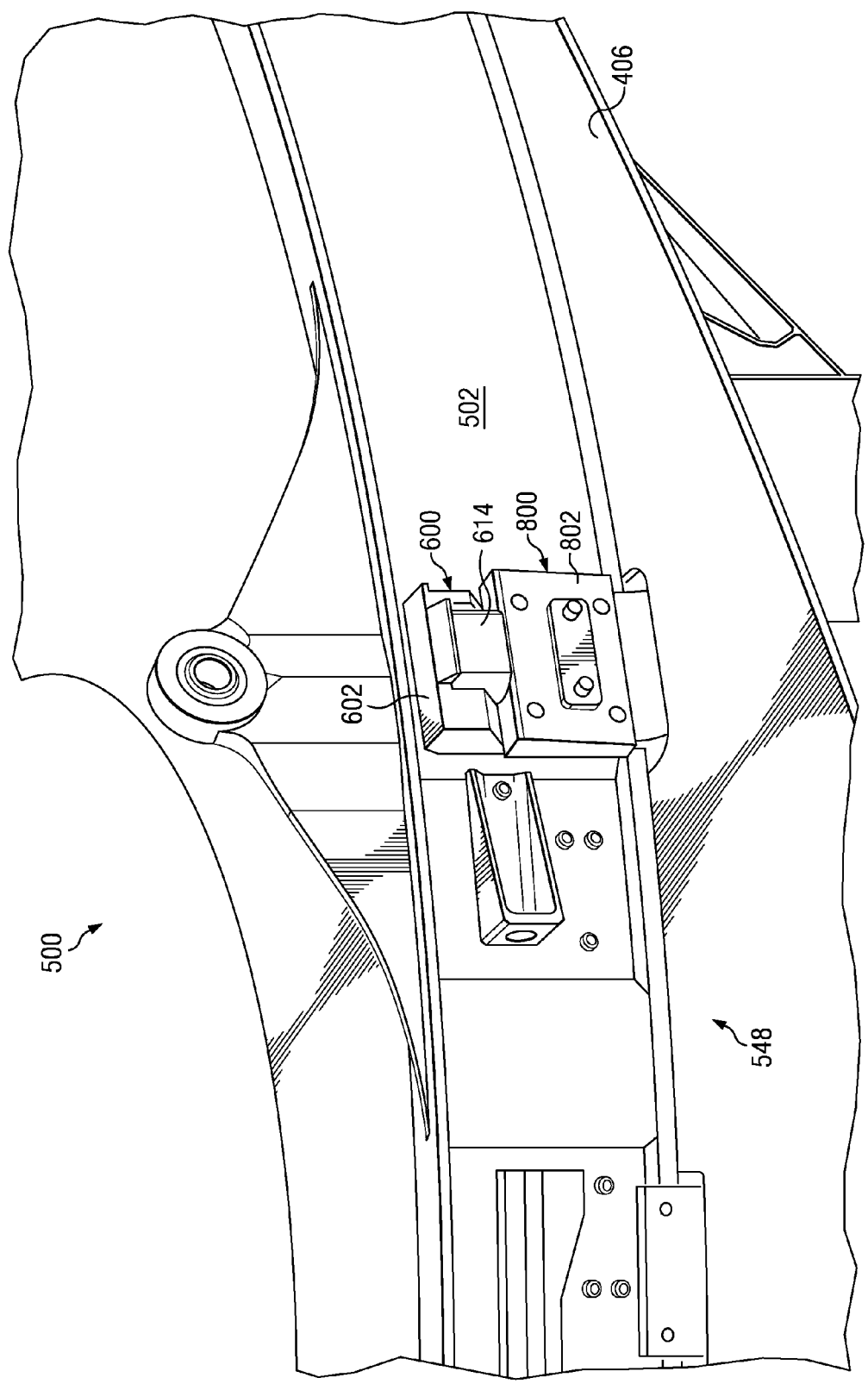
FIG. 17 is an illustration of a completed assembly of a lifting assembly, a base assembly, and a biasing unit in accordance with an advantageous embodiment.

With reference now to FIG. 17, an illustration of a completed assembly of a lifting assembly, a base assembly, and a biasing unit is depicted in accordance with an advantageous embodiment. In this example, biasing unit 614 may be placed between lifting assembly 600 and base assembly 800.

Figure 18:
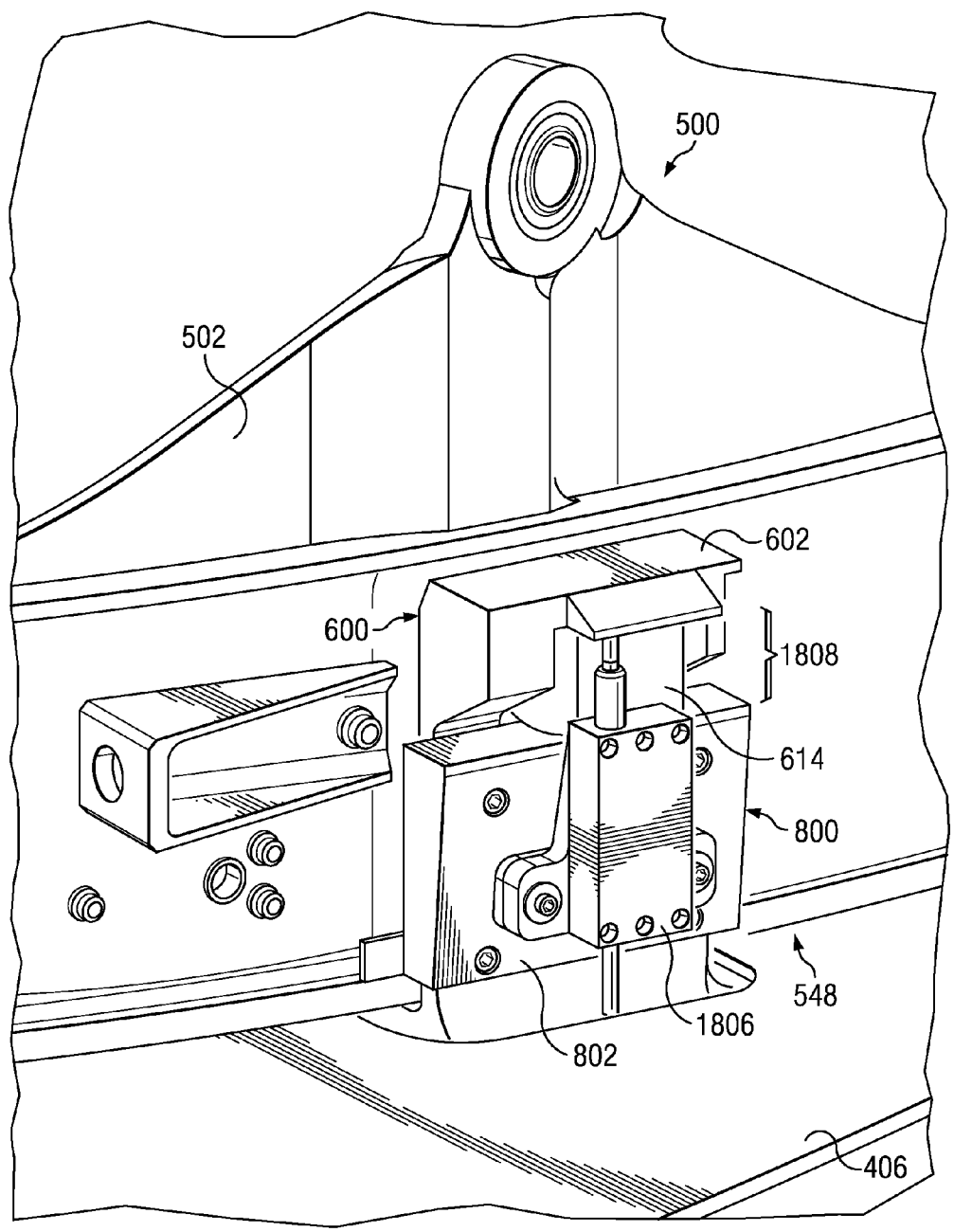
FIG. 18 is an illustration of a portion of a wing lift system in accordance with an advantageous embodiment.

Turning now to FIG. 18, an illustration of a portion of a wing lift system is depicted in accordance with an advantageous embodiment. In this illustrative example, measurement unit 1806 may be present. Measurement unit 1806 may measure displacement 1808 between lifting assembly 600 and base assembly 800. Measurement unit 1806 may generate and transmit information wirelessly to a remote location. In this view, ring 502 may sit on sliders (not shown).

Figure 19:
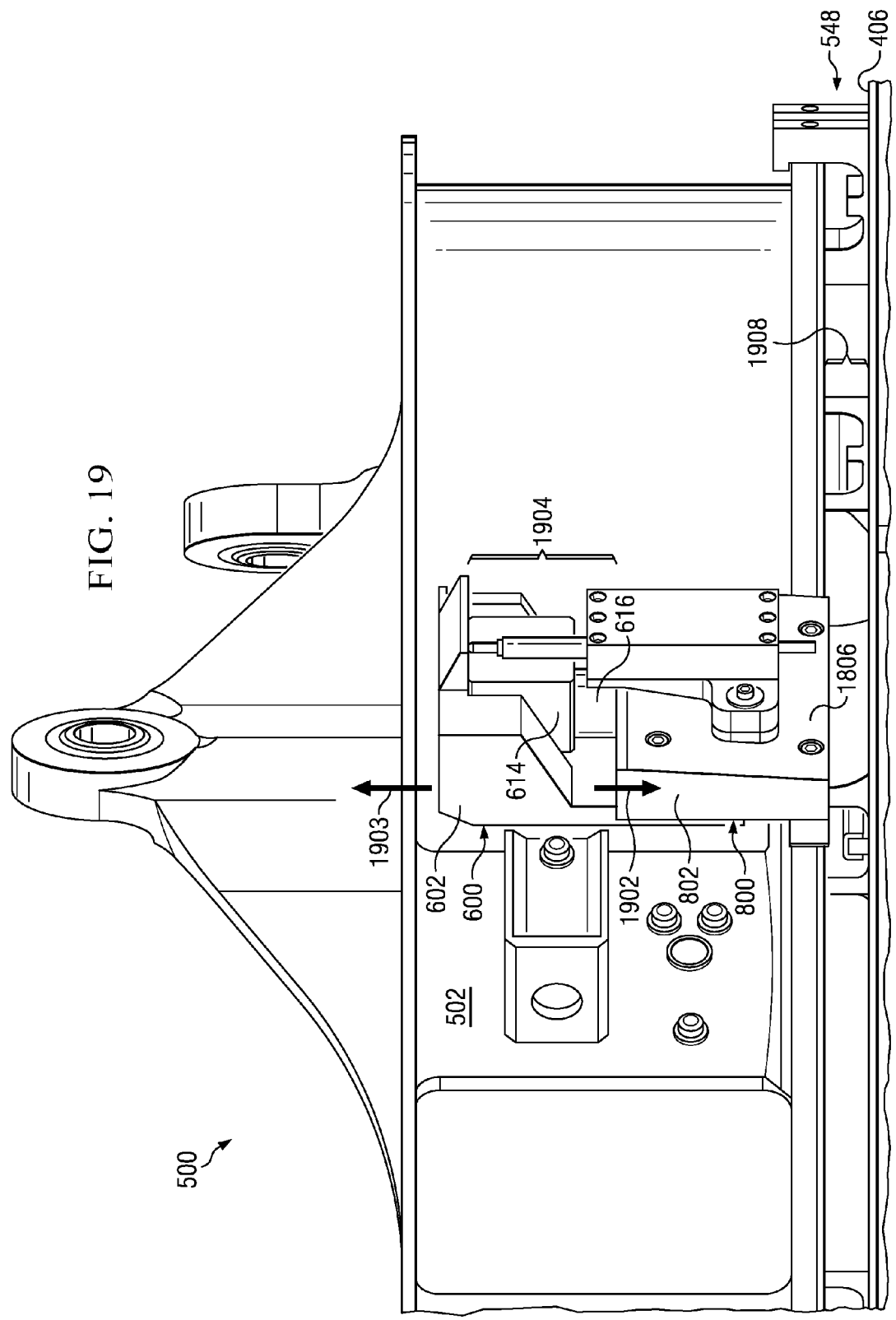
FIG. 19 is an illustration of a wing in a lifted position in accordance with an advantageous embodiment.

With reference now to FIG. 19, an illustration of a wing in a lifted position is depicted in accordance with an advantageous embodiment. In this illustrative example, biasing unit 614 may have moved piston 616 (not shown in this view) in the direction of arrow 1902. This movement of piston 616 may cause displacement 1904. Displacement 1904 may be greater than displacement 1808 in FIG. 18. This movement of piston 616 may cause ring 502 to move in the direction of arrow 1903.

As a result, gap 1908 may be present between ring 502 and fuselage 406. Gap 1908 may be about 0.5 inches in these illustrative examples. Of course, different gaps may be selected, depending on the particular implementation and maintenance operation to be performed.

With reference now to FIG. 20, an illustration of a flowchart of a process for moving a wing is depicted in accordance with an advantageous embodiment. The process illustrated in FIG. 20 may be implemented in wing lift environment 300 in FIG. 3. In particular, the process may be implemented using wing lift system 322 to move wing 304 relative to fuselage 306.

The process may begin by attaching plurality of lifting assemblies 324 to first plurality of channels 311 in ring 312 associated with wing 304 of aircraft 302 (operation 2000). The process may then attach plurality of base assemblies 326 to plurality of fittings 308 with second plurality of channels 310 (operation 2002). The process may then move plurality of lifting assemblies 324 away from plurality of base assemblies 326 using plurality of biasing systems 328 such that ring 312 moves away from fuselage 306 (operation 2004), with the process terminating thereafter.

With reference now to FIG. 21, an illustration of a flowchart for using a wing lift system is depicted in accordance with an advantageous embodiment. The process illustrated in FIG. 21 describes operations for performing maintenance on an aircraft. The process illustrated in FIG. 21 may be implemented using wing lift environment 300 in FIG. 3.

The process may begin by rotating ring 312 associated with wing 304 (operation 2100). This rotation may be, for example, about a few degrees. As one illustrative example, ring 312 may be rotated from about 12 degrees to about 15 degrees. The rotation of ring 312 may be such that wing lift system 322 may be installed onto ring 312.

Plurality of lifting assemblies 324 may be connected to first plurality of channels 311 for ring 312 (operation 2102). Plurality of base assemblies 326 may be connected to plurality of fittings 308 with second plurality of channels 310 (operation 2104). The process also may connect plurality of biasing systems 328 to plurality of lifting assemblies 324 (operation 2106).

The process may then rotate ring 312 such that first plurality of channels 311 may be substantially aligned with second plurality of channels 310 (operation 2107). Ring 312 may be rotated in operation 2107 using a cable, such as cable 1604 in FIG. 16. Thereafter, the process may operate plurality of biasing systems 328 such that ring 312 with wing 304 may move away from fuselage 306 (operation 2108). This operation may result in a displacement being present between ring 312 and fuselage 306.

Blocks may then be placed into the gap (operation 2110). The blocks may provide for additional safety such that reliance on plurality of biasing systems 328 to maintain the gap is reduced and/or unnecessary. The process may then perform maintenance operations on ring 312 and/or on components around or otherwise associated with ring 312 (operation 2112). In operation 2112, maintenance operations may be performed while plurality of biasing systems 328 is not in operation.

When the maintenance operations are completed, the process may then remove the blocks (operation 2114). The process may then operate plurality of biasing systems 328 to lower ring 312 onto fuselage 306 (operation 2116). The process may then rotate ring 312 using a cable (operation 2118). In operation 2118, the cable used to rotate ring 312 may be a different cable than cable 1604 used to rotate ring 312 in operation 2107. Plurality of lifting assemblies 324, plurality of base assemblies 326, and plurality of biasing systems 328 may then be removed (operation 2120). Thereafter, cables for use with ring 312 may be reinstalled (operation 2122). The process may then rotate ring 312 with wing 304 to a desired position (operation 2124), with the process terminating thereafter.

Figure 22:
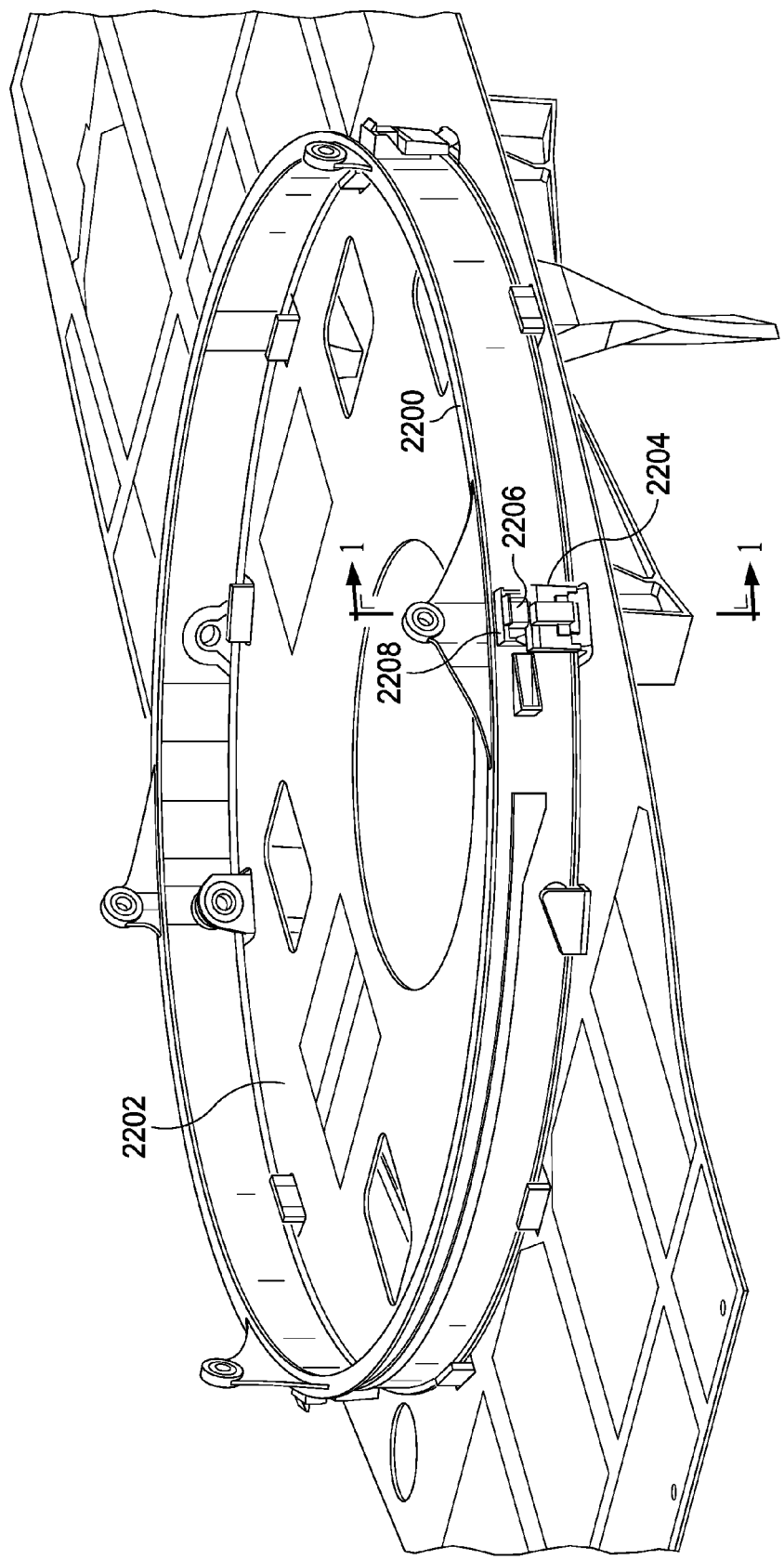
FIG. 22 is an illustration of a ring lifted above a fuselage of an aircraft, the ring usable to support the wing in accordance with an illustrative embodiment.

FIG. 22 is an illustration of a ring lifted above a fuselage of an aircraft, the ring usable to support the wing, in accordance with an illustrative embodiment. Ring 2200 may be part of rotation system 408 of tilt-rotor aircraft 402 in FIG. 4. Another view of ring 2200 is shown as ring 502 in FIG. 5. Ring 2200 may also be referred to as a mounting ring.

The illustrative embodiments contemplate a two-stage lifting system to lift ring 2200 above fuselage 2202 of the aircraft. This two stage lift system is described in detail in FIG. 23 through FIG. 28.

FIG. 22 also shows the location of a vertical cross section, shown as 1-1, in order to show a side view of the various components used in the two-stage lifting operation. In FIG. 23 through FIG. 26 this vertical cross section shows the various components used during the two stage lifting operation. Thus, this vertical cross section is drawn through ring 2200, first base assembly 2204, biasing unit 2206, and lifting assembly 2208. First base assembly 2204 may correspond to base assembly 800 in FIG. 8. Biasing unit 2206 may correspond to biasing unit 614 in FIG. 6. Lifting assembly 2208 may correspond to lifting assembly 600 in FIG. 6. A more detailed side view of these components is shown in FIG. 27 and FIG. 28.

Figure 24:
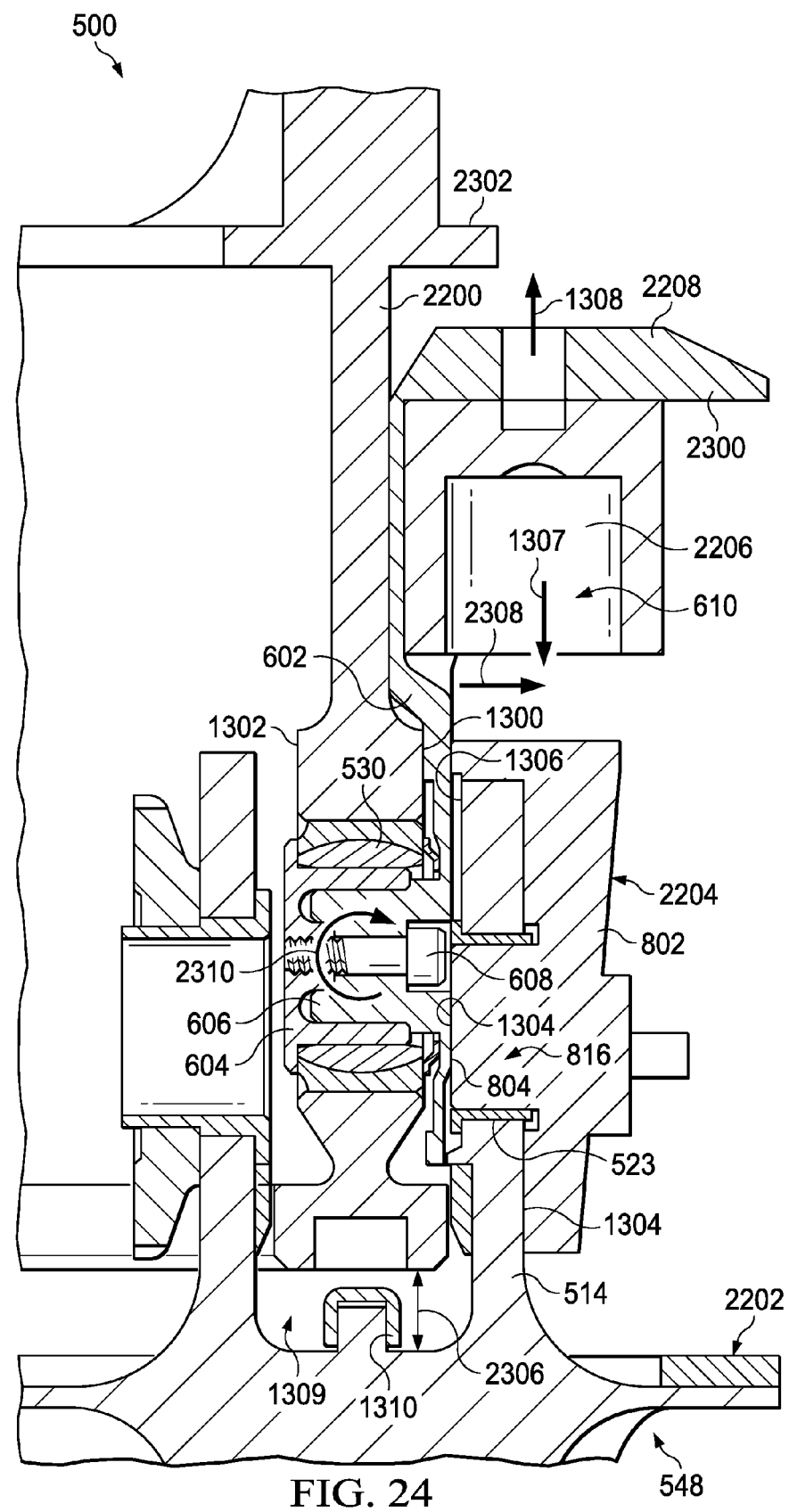
FIG. 24 is an illustration of a cross-sectional view of a ring and fitting with a portion of a wing lift system after the first stage of a lifting operation in accordance with an advantageous embodiment.
Figure 25:
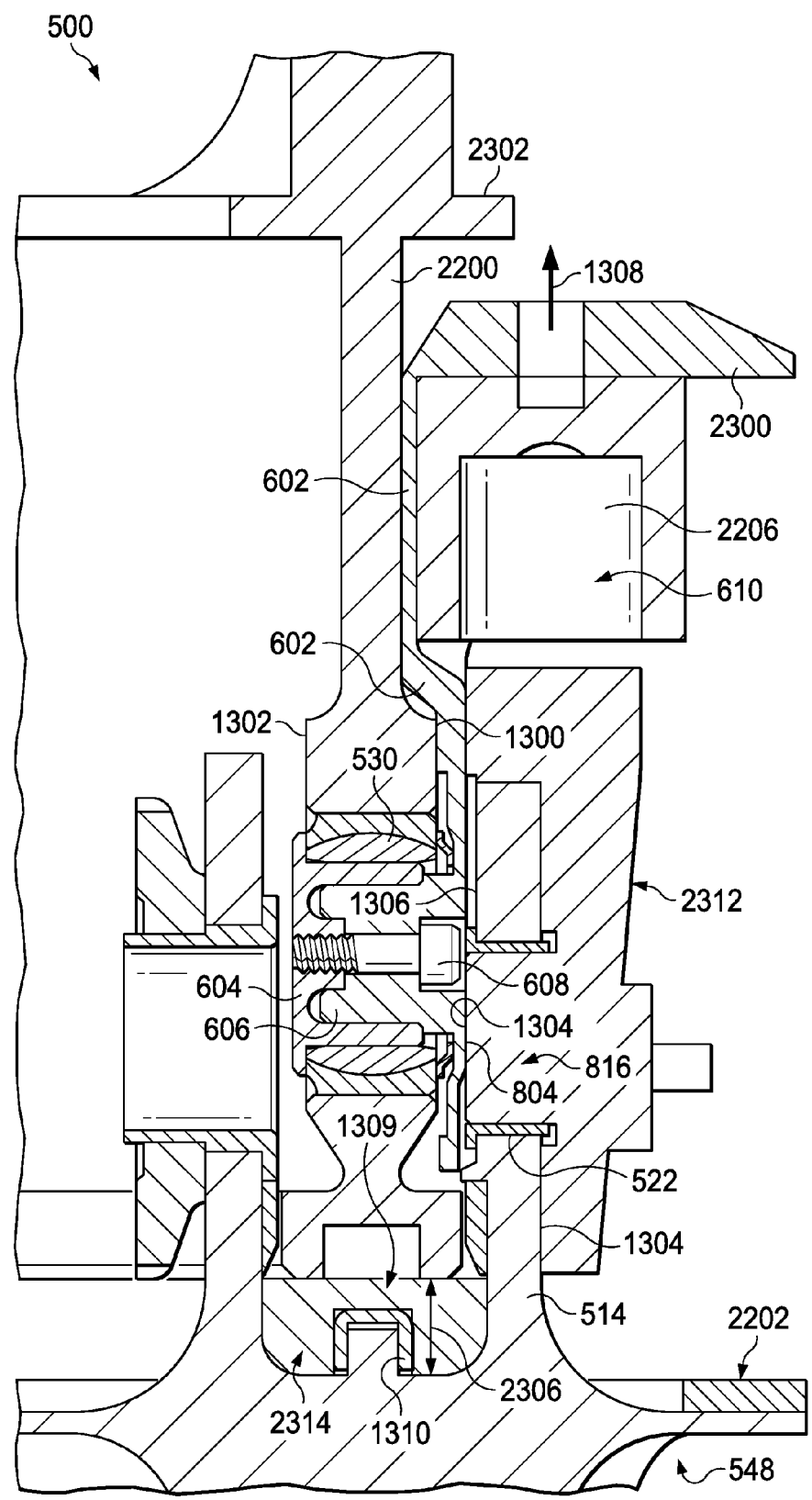
FIG. 25 is an illustration of a cross-sectional view of a ring and fitting with a portion of a wing lift system in a second stage of a lifting operation in accordance with an advantageous embodiment.
Figure 26:
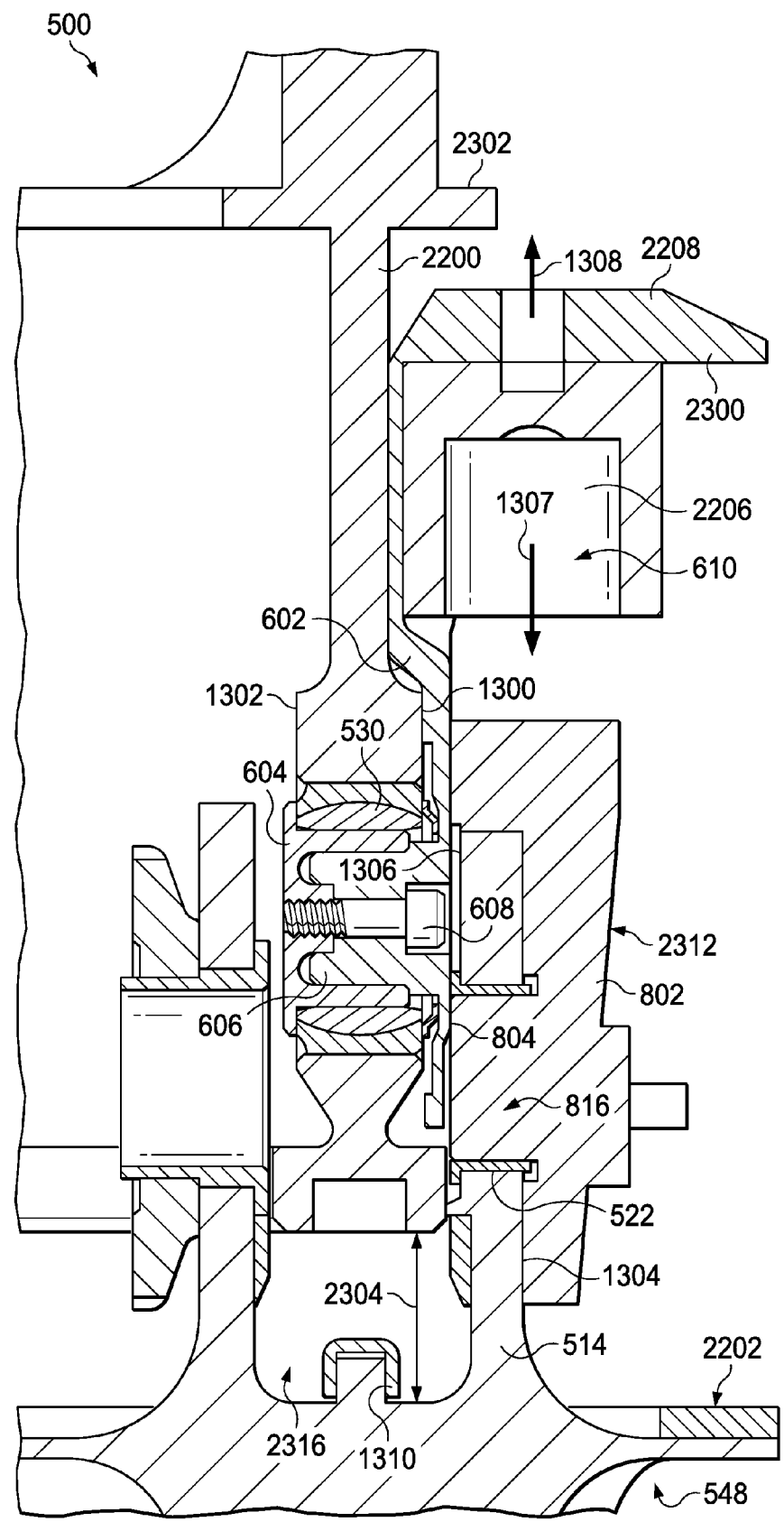
FIG. 26 is an illustration of a cross-sectional view of a ring and fitting with a portion of a wing lift system after the second stage of a lifting operation in accordance with an advantageous embodiment.
Figure 28:
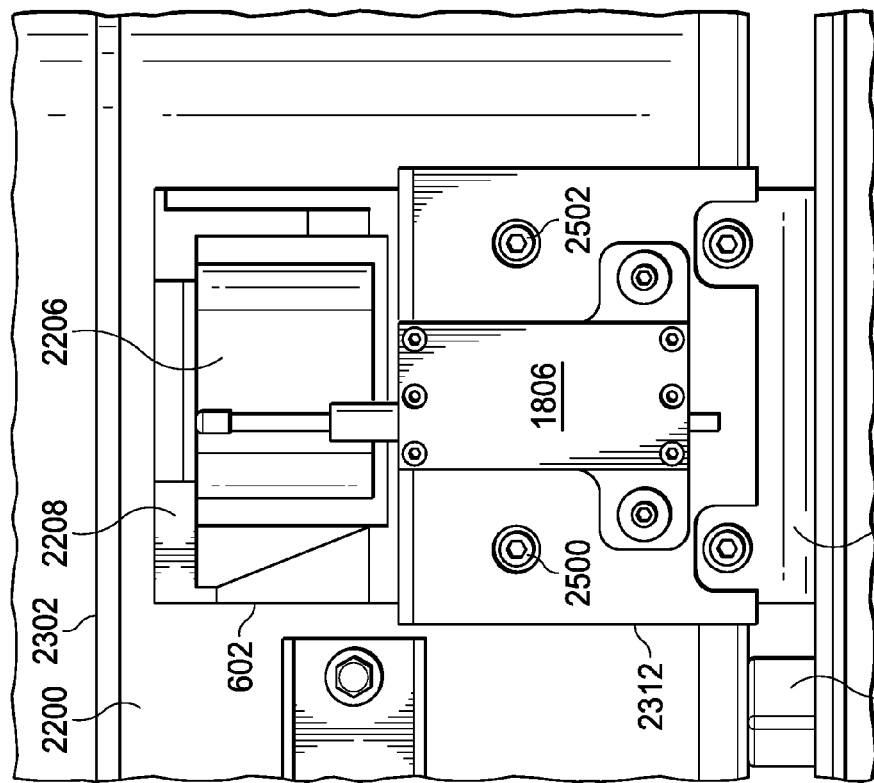
FIG. 28 is an illustration of a side view of a ring and fitting with a second base assembly in accordance with an advantageous embodiment.
Figure 27:
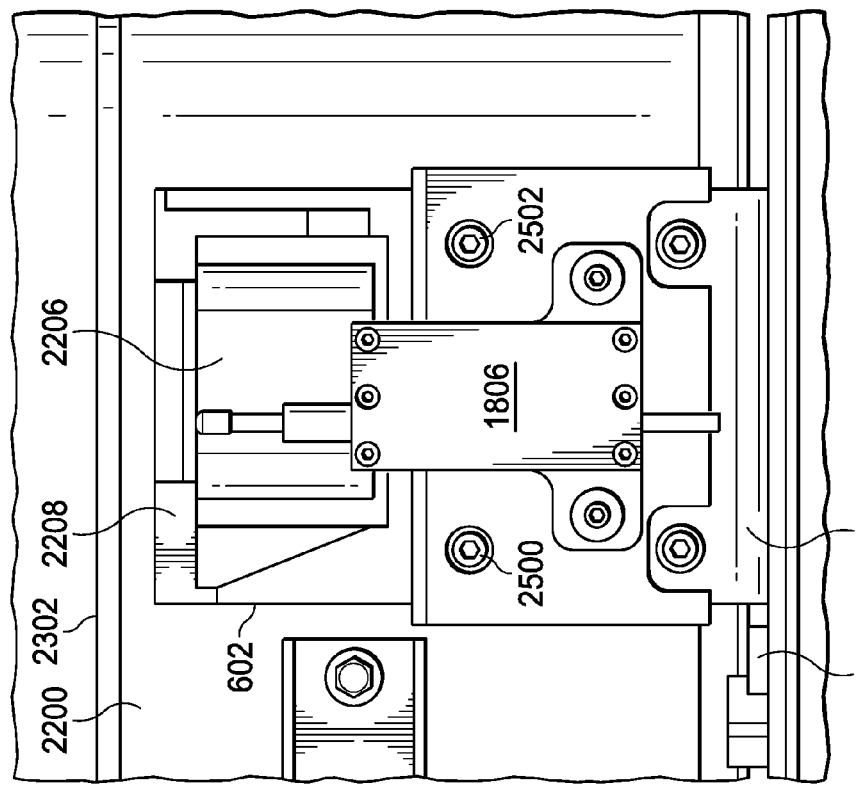
FIG. 27 is an illustration of a side view of a ring and fitting with a first base assembly in accordance with an advantageous embodiment.

Note that second base assembly 2312, used in the second stage of the two-stage lifting assembly, is shown in FIG. 25, FIG. 26, and FIG. 28. Second base assembly 2312 may have an appearance similar to that of first base assembly 2204 shown in FIG. 22 through FIG. 24 and also in FIG. 27, and may be placed in a similar location. However, second base assembly 2312 is larger than first base assembly 2204.

Figure 23:
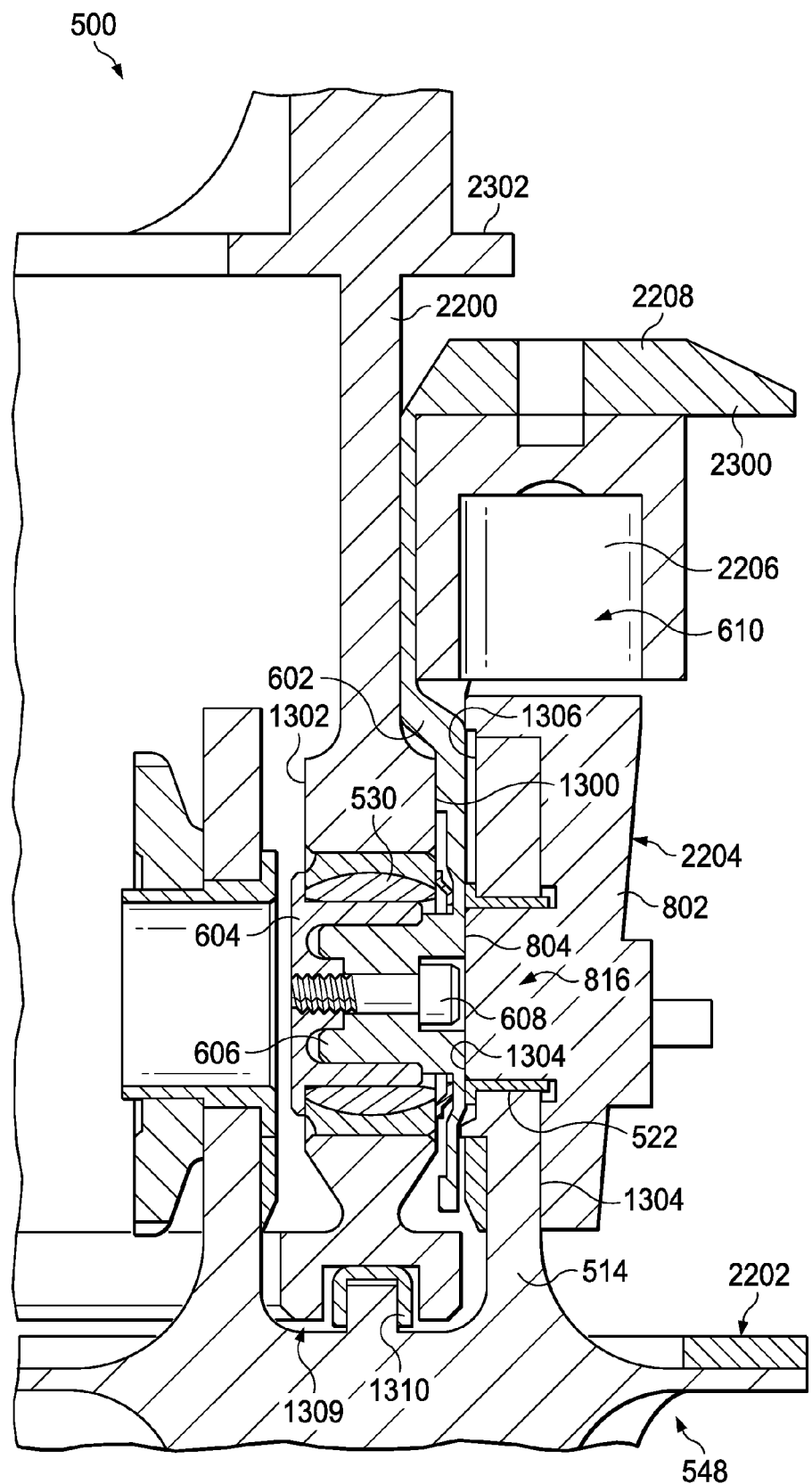
FIG. 23 is an illustration of a cross-sectional view of a ring and fitting with a portion of a wing lift system in a first stage of a lifting operation in accordance with an advantageous embodiment.

FIG. 23 though FIG. 26 should be viewed together as a whole. Each of these figures represents a portion of a two-stage lifting operation for lifting a wing from a ring, in an extended operation relative to the procedures described above with respect to FIG. 1 through FIG. 21. FIG. 23 shows the position of components before the first lifting operation. FIG. 24 shows the position of components after the first lifting operation. FIG. 25 is an illustration of a cross-sectional view of a ring and fitting with a portion of a wing lift system in a second stage of a lifting operation in accordance with an advantageous embodiment. FIG. 25 shows the position of components after the first lifting operation, but before the second lifting operation, with the second base assembly installed. FIG. 26 shows the position of components after the second lifting operation.

For each of FIG. 1 through FIG. 26, reference numerals common to earlier described objects are repeated and have similar descriptions and functions from those described above. Although FIG. 22 through FIG. 26 illustrate a side cut-out view of a single set of first base assembly 2204, second base assembly 2312, biasing unit 2206, and lifting assembly 2208, several sets of such devices may be placed around ring 2200 in order to aid in lifting ring 2200.

With reference now to FIG. 23, an illustration of a cross-sectional view of a ring and fitting with a portion of a wing lift system in a first stage of a lifting operation is depicted in accordance with an advantageous embodiment. Specifically, FIG. 23 shows a view of ring 2200 taken at cross section lines 1-1 in FIG. 22. The components shown include first base assembly 2204, biasing unit 2206, and lifting assembly 2208.

Fitting 514 is positioned under biasing unit 2206. Fitting 514 may be part of rotation system 408 that remains fixed to the aircraft.

Biasing unit 2206 may be a piston, and in some illustrative embodiments may be referred to as a biasing system. A piston is preferably a hydraulic piston, but in some cases may be a pneumatic piston. Other types of biasing units may be contemplated, such as a ratchet lifting system akin to a jack.

In this illustrative example, member 606 may have a fixed length between lifting bracket 602, in lifting assembly 2208 on side 1300 of ring 2200, and channel 530. Member 606 may be a stationary boss which engages cap 604, which may be termed a lifting cap. Note that lifting bracket 602 may have a different shape than the similar component shown in FIG. 13, such as for example including a flange such as flange 2300.

Cap 604 may be installed from side 1302 of ring 2200. Cap 604 may engage member 606 inside the bore.

Member 816 may extend into channel 522 on side 1304 of fitting 514. Plate 804 may be located on side 1306 of fitting 514 and may be secured to base structure 802.

Biasing unit 2206 may be located within cavity 610. Biasing unit 2206 may apply a force in the direction of arrow 1307. This force may cause lifting assembly 2208 to move in the opposite direction of arrow 1307 in the direction of arrow 1308. This movement of lifting bracket 602 may cause ring 2200 to move in the direction of arrow 1308 away from fuselage 2202. This movement may increase the size of space 1309, which may allow for maintenance to be performed. For example, maintenance may be performed on slider 1310. More specifically, slider 1310 may be replaced if space 1309 is increased by using lifting assembly 2208, first base assembly 2204, and biasing unit 2206.

The different advantageous embodiments recognize that jacking methods for lifting ring 2200 possibly may not be used to increase the size of space 1309. Typical jacking methods may require space for a jack to be positioned under flange 2302 of ring 2200 and a reacting surface for the jack to push against.

In these illustrative examples, space under flange 2302 of ring 2200 and fitting 514 may be insufficient for the jack to be positioned. Further, the reacting surface of fitting 514 may be insufficient for the jack to push against to lift ring 2200. Additionally, the surface of fuselage 2202 may not have a desired hardness to function as a reacting surface for the jack, if the jack were to be placed between fuselage 2202 and flange 2302. Thus, it may be impossible, impracticable, or otherwise undesirable for a jack to be used to lift ring 2200 to second height 2306, much less first height 2304.

Stated differently, it is desirable to lift a wing of an aircraft to first height 2304 in FIG. 26 relative to fuselage 2202 of the aircraft. However, flange 2302 limits the distance which a jack could raise ring 2200 to a value that is less than first height 2304. Flange 2302 may also limit the distance which a jack could raise ring 2200 to a value that is less than second height 2306 (note that second height 2306 is less than first height 2304). In some cases, for the reasons given above, a jack cannot be used to lift ring 2200 at all.

Stated still differently, flange 2302 may limit lifting of the mounting ring by lifting methods that do not use first base assembly 2204 and second base assembly 2312. An example of a lifting method that does not use first base assembly 2204 and second base assembly 2312 is using a jack, as described above. Other examples exist.

Additionally, another difficulty occurs when attempting to raise ring 2200 to first height 2304. In particular, after lifting ring 2200 to or past second height 2306 shown in FIG. 24 and FIG. 25, bending moment 2308 in lifting bracket 602 tends to force lifting bracket 602 to buckle outwardly, as shown by the arrow indicating bending moment 2308 in FIG. 24. This bending moment 2308 arises as a result of torque in cap 604, member 606, and fastener 608 that is applied as a result of the forces occurring during a given lifting operation. This torque is shown as circular arrow 2310 in FIG. 24.

Buckling or failure of lifting bracket 602 of lifting assembly 2208 is undesirable. Thus, using biasing unit 2206 to continue to raise lifting assembly 2208 and ring 2200 past second height 2306 may be undesirable, even in cases where biasing unit 2206 is not limited by the distance its piston or other pushing member could extend when lifting beyond second height 2306. Therefore, according to an illustrative embodiment, a second lifting operation using second base assembly 2312, described in FIG. 25 and FIG. 26, is provided to resolve this above-described difficulty.

FIG. 24 shows the first operation of the single stage lifting system described in FIG. 1 through FIG. 21, as well as the operation of the two-stage lifting system shown in FIG. 23. The result of the first operation of the two-stage lifting system is to lift ring 2200 by second height 2306, shown in FIG. 24.

Attention is now turned to the expanded lifting system, which is shown in FIG. 25 and FIG. 26. In some cases, it may be desirable to further lift ring 2200 by a greater distance, namely to lift ring 2200 from second height 2306 (FIG. 24 and FIG. 25) to first height 2304 (FIG. 26). In a specific, non-limiting illustrative embodiment, second height 2306 may be 0.5 inches and first height 2304 may be 1.0 inches, though these heights may be varied in different illustrative embodiments.

Prior to performing the second lift operation using the two-stage lift system, retaining object 2314 may be placed inside space 1309. Retaining object may be a chock, safety block, or some other device capable of holding the weight of ring 2200 after first base assembly 2204 is removed. In an illustrative embodiment, retaining object 2314 is either into or out of the plane of cross section lines 1-1 shown in FIG. 25, as fitting 514 may make placing retaining object 2314 between the two vertical members of fitting 514 difficult. An example of an arrangement of retaining object 2314 being out of the plane of cross section 1-1 is shown in FIG. 27, where retaining object 2314 is shown to the left of fitting 514.

Attention is now turned to the second stage of the two-stage operation described herein. The additional lift is accomplished using second base assembly 2312, shown in FIG. 25 and FIG. 26, after the use of first base assembly 2204 in FIG. 23 and FIG. 24. To summarize the first lifting operation, first base assembly 2204 is attached to fitting 514, as shown in FIG. 23 and FIG. 24. Biasing unit 2206 is then used to lift ring 2200 to second height 2306, as shown in FIG. 24. At this point, retaining object 2314 may be inserted under ring 2200.

Thereafter, first base assembly 2204 is removed from fitting 514. For example, fastener 2500 and fastener 2502 shown in FIG. 27 and FIG. 28 may be removed. After first base assembly 2204 is removed, second base assembly 2312 is connected to fitting 514. Again, a variety of fasteners, such as fastener 2500 and 2502, may be used to secure second base assembly 2312 to fitting 514. Note that the positions of lifting assembly 2208 and biasing unit 2206 do not change while the two base assemblies are switched out, though biasing unit 2206 may be reset so that it can perform another lifting operation using second base assembly 2312 as an anvil.

Second base assembly 2312 is larger or taller than first base assembly 2204. Specifically, second base assembly 2312 has a sufficiently greater height relative to first base assembly 2204 such that when biasing unit 2206 pushes against second base assembly 2312, lifting assembly 2208 will be raised by an amount that equals the difference between first height 2304 and second height 2306. In this manner, ring 2200 is raised to first height 2304 and ring 2200 is held suspended over slider 1310. As a result, space 2316 in FIG. 26 is increased relative to space 1309 shown in FIG. 25. Accordingly, an operator has greater access to the components within space 2316, thereby improving the ease of maintenance of such components.

Optionally, retaining object 2314 may remain in place after this second lifting operation in order to prevent ring 2200 from accidentally falling onto fuselage 2202. Optionally, second retaining object 2318, suitably larger than retaining object 2314, may be inserted in some other location under ring 2200 to retain ring 2200 at the higher lift position. Optionally, second retaining object 2318 may replace retaining object 2314.

Note that in the expanded lifting system described above, lifting assembly 2208 includes lifting bracket 602, as also shown in FIG. 23 through FIG. 26, as well as in FIG. 6. In each of the first and second lifting stages shown in FIG. 23 through FIG. 26 respectively, bending moment 2308 in lifting bracket 602 reacts against first base assembly 2204 during the first lift operation and reacts against second base assembly 2312 during the second lifting operation. In both lifting operations, this bending moment 2308 ultimately reacts against fitting 514 and is transferred into fuselage 2202 of the aircraft. Thus, first base assembly 2204, second base assembly 2312, and fitting 514 help lifting bracket 602 to remain rigid during each respective lifting operation. Stated differently, first base assembly 2204 reacts against bending moment 2308 in lifting bracket 602 arising from the first lifting operation, and second base assembly 2312 reacts against bending moment 2308 in lifting bracket 602 arising from the second lifting operation.

Note, also, that the length between the top of a given base assembly and the biasing unit should remain below a threshold distance so as to avoid too much of lifting bracket 602 being exposed without the benefit of support from a corresponding base assembly. In other words, as this length increases during a lifting operation, the relatively thin area of lifting bracket 602 becomes exposed and is no longer supported. One of the purposes of second base assembly 2312 is to ensure that more of this area of lifting bracket 602 is backed by second base assembly 2312 in order to react to bending moment 2308 during the second lifting operation.

The illustrative embodiments described above are not necessarily limited by the specific examples described with respect to FIG. 22 through FIG. 26. For example, additional lifting operations could be performed by providing succeeding taller or larger base assemblies, and switching out a smaller base assembly for a larger base assembly at each lifting stage. In some illustrative embodiments, only one set of a base assembly, a lifting assembly, and a biasing unit are needed to lift ring 2200, though in other illustrative embodiments multiple such sets may be used to lift ring 2200. Retaining object 2314 may take a variety of different shapes and sizes, and may, in some cases, be optional, such as when ring 2200 is suspended or otherwise supported in some other manner. Thus, the illustrative embodiments described with respect to the figures do not necessarily limit the claimed inventions.

FIG. 27 and FIG. 28 should be viewed together. FIG. 27 and FIG. 28 provide an alternative view of some components shown in FIG. 22 through FIG. 26. Reference numerals in FIG. 27 and FIG. 28 that are common to reference numerals in earlier figures have common descriptions and common functions.

FIG. 27 and FIG. 28 again show the two-stage lifting operation described in FIG. 22 through FIG. 26. After the first lifting operation using first base assembly 2204, retaining object 2314 is inserted under ring 2200 in order to support ring 2200, as shown in FIG. 27. Use of retaining object 2314 may not be necessary if some other means of supporting ring 2200 is used, such as a suspension from above or some other type of support.

In any case, after ring 2200 is properly supported, first base assembly 2204 in FIG. 27 is removed. For example, fasteners, such as fastener 2500 and 2502 are removed from fitting 514 and then first base assembly 2204 is removed.

Thereafter, second base assembly 2312 is secured to ring 2200. This operation may be accomplished by reinserting fastener 2500 and fastener 2502, though different fasteners could be used if desired. Again, second base assembly 2312 may be taller or larger than first base assembly 2204.

After second base assembly 2312 is secured to ring 2200, then biasing unit 2206 may be used again to further lift ring 2200 by pressing down on second base assembly 2312. The additional lift achieved may be equal to a difference in lengths between first base assembly 2204 and second base assembly 2312. However, the total height lifted may be varied by varying the amount of lift performed by biasing unit 2206 at either lifting stage. The total height lifted may be monitored by measurement unit 1806.

In each of the first and second lifting stages shown in FIG. 27 and FIG. 28 respectively, bending moment 2308 in lifting bracket 602 reacts against a corresponding base assembly, as described above. Thus, the two base assemblies help lifting bracket 602 to remain rigid during each corresponding lifting operation.

Figure 29:
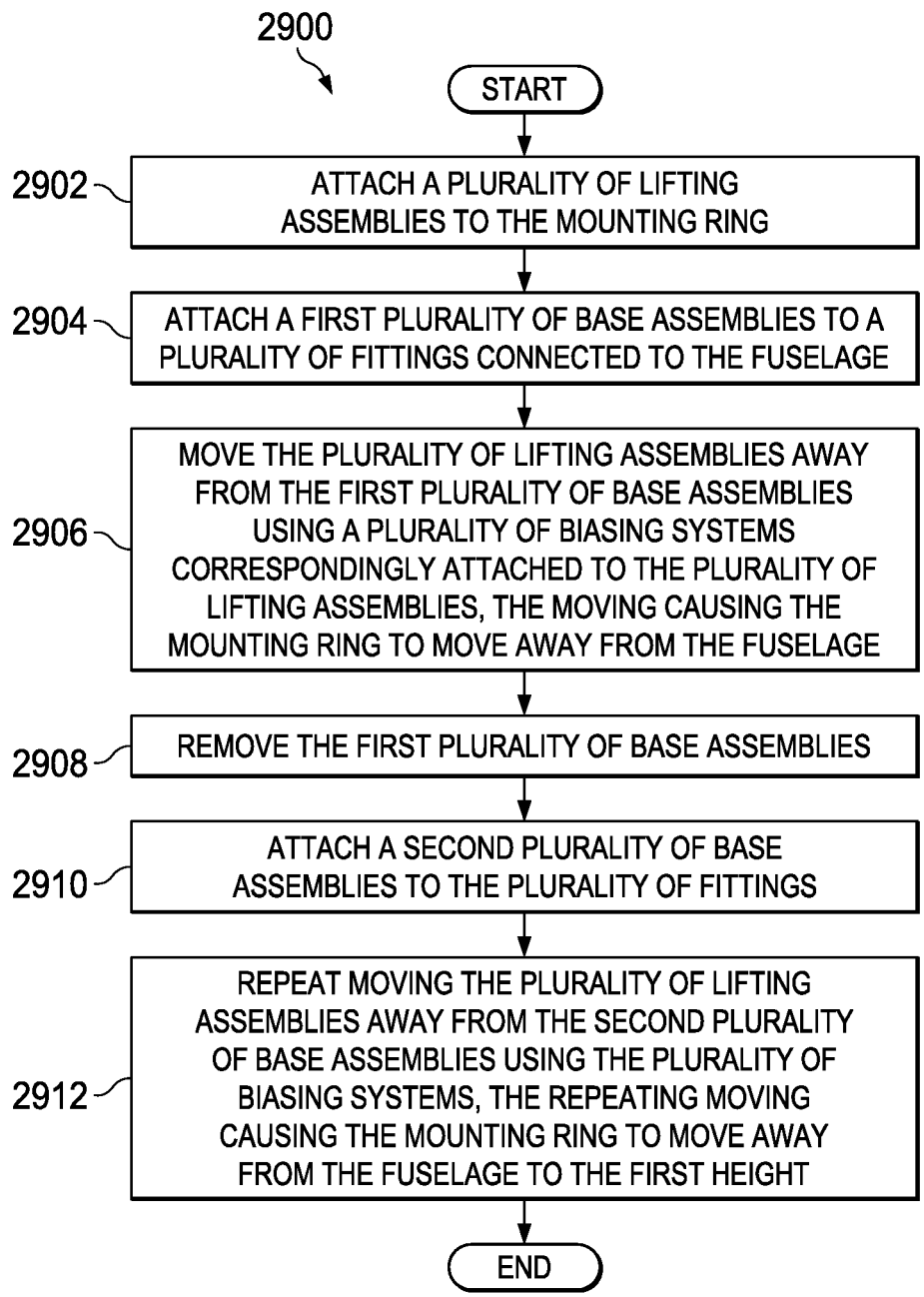
FIG. 29 is a flowchart of a multi-stage lifting operation in accordance with an illustrative embodiment.

With reference now to FIG. 29, a flowchart of a multi-stage lifting operation is depicted in accordance with an illustrative embodiment. Method 2900 may be an example of the expanded lifting operation described with respect to FIG. 22 through FIG. 28. Method 2900 may be characterized as a method for lifting a wing of an aircraft to a first height relative to a fuselage of the aircraft, the wing being on a mounting ring disposed on the fuselage.

Method 2900 may begin by attaching a plurality of lifting assemblies to the mounting ring (operation 2902). Next, method 2900 may include attaching a first plurality of base assemblies to a plurality of fittings connected to the fuselage (operation 2904). Next, method 2900 may include moving the plurality of lifting assemblies away from the first plurality of base assemblies using a plurality of biasing systems correspondingly attached to the plurality of lifting assemblies, the moving causing the mounting ring to move away from the fuselage (operation 2906). Next, method 2900 may include removing the first plurality of base assemblies (operation 2908). Next, method 2900 may include attaching a second plurality of base assemblies to the plurality of fittings (operation 2910). Finally, thereafter, method 2900 may include repeating moving the plurality of lifting assemblies away from the second plurality of base assemblies using the plurality of biasing systems, the repeating moving causing the mounting ring to move away from the fuselage to the first height (operation 2912). The process may terminate thereafter.

The process described in FIG. 29 may be varied. For example, in an illustrative embodiment, each base assembly in the first plurality of base assemblies may have a first length and each base assembly in the second plurality base assemblies may have a second length greater than the first length.

In another illustrative embodiment, a first difference between the second length and the first length may be greater than or equal to a second difference between second height and the first height.

In a related illustrative embodiment, the plurality of biasing systems may be a plurality of pistons and wherein the plurality of base assemblies comprise a plurality of anvils against which the plurality of pistons press. In this case, operation of all of the plurality of pistons is limited to the second height. In other words, the pushing member of any of the plurality of pistons is too short to accomplish a second lift, or the distance to which the piston may be extended is too short to accomplish the second lift.

In still another illustrative embodiment, the mounting ring may include a flange. In this case, the flange limits lifting of the mounting ring by lifting methods that do not use the first plurality of base assemblies and the second plurality of base assemblies.

In a different illustrative embodiment, method 2900 may also include, before removing the first plurality of base assemblies, inserting a plurality of retaining objects between the fuselage and bottoms of the first plurality of base assemblies. In this case, method 2900 may also include, after attaching the second plurality of base assemblies, removing the plurality of retaining objects. Furthermore, in another illustrative embodiment, the plurality of retaining objects may be blocks that together have sufficient material strength to support a weight of the mounting ring.

In a still different illustrative embodiment, the plurality of fittings may be a first plurality of channels which receive bolts that connect the plurality of fittings to the first plurality of base assemblies and later to the second plurality of base assemblies. In this case, method 2900 may further include inserting the bolts into the first plurality of channels. In this case, the plurality of lifting assemblies may be a second plurality of channels that receive second bolts that connect the mounting ring to the plurality of lifting assemblies. Yet further, the first plurality of channels may be unaligned with the second plurality of channels.

In a yet different illustrative embodiment, method 2900 may also include removing the second plurality of base assemblies; attaching a third plurality of base assemblies to the plurality of fittings; and thereafter repeating moving the plurality of lifting assemblies away from the third plurality of base assemblies using the plurality of biasing systems. The repeating moving causes the mounting ring to move further away from the fuselage.

In this case, method 2900 may also include, before removing the second plurality of base assemblies, inserting a second plurality of retaining objects between the fuselage and bottoms of the second plurality of base assemblies. Yet further, method 2900 may include, after attaching the third plurality of base assemblies, removing the second plurality of retaining objects.

In a yet another illustrative embodiment, method 2900 may include attaching the plurality of fittings to the fuselage. In a still different illustrative embodiment, the plurality of lifting assemblies each may be a corresponding lifting bracket. In this case, method 2900 may further include reacting a corresponding bending moment in each corresponding lifting bracket against each corresponding second base assembly of the plurality of second base assemblies while moving the plurality of lifting assemblies.

Figure 30:
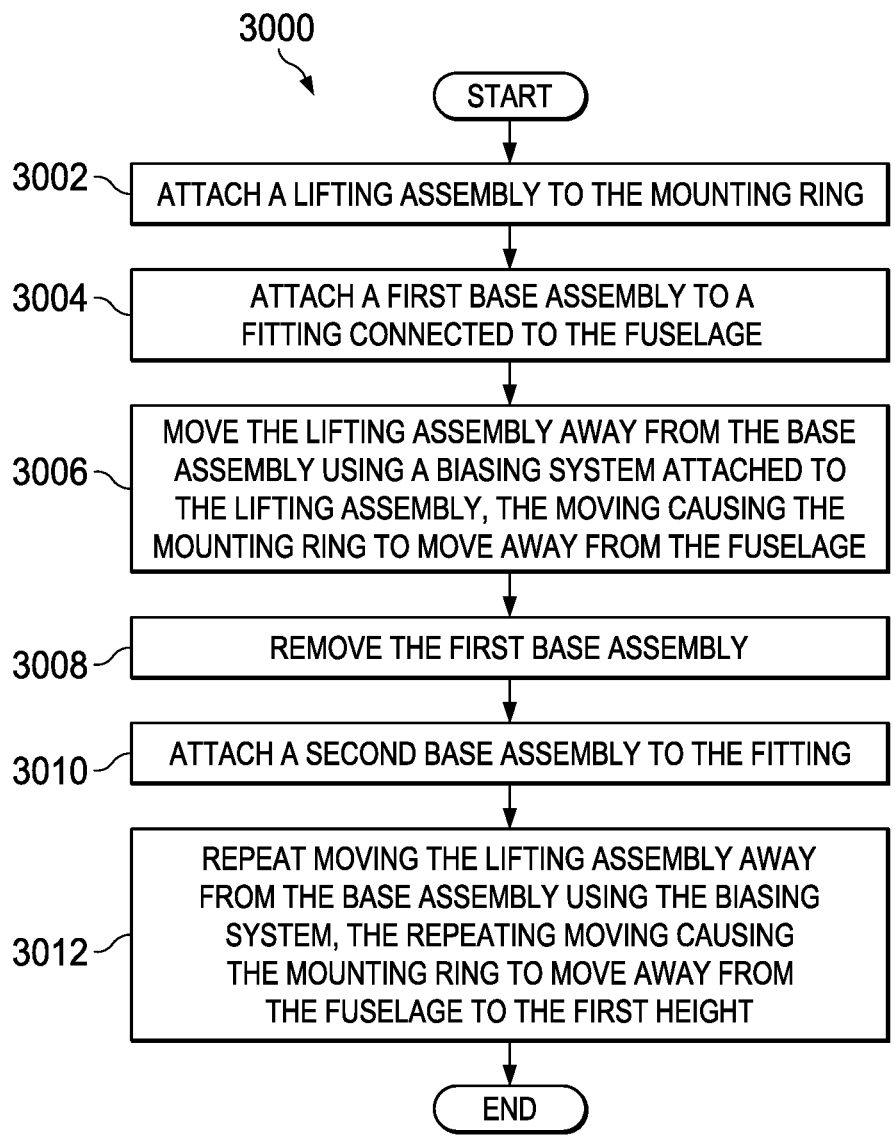
FIG. 30 is a flowchart of a method for lifting a wing of an aircraft in accordance with an illustrative embodiment.

With reference now to FIG. 30, a flowchart of a method for lifting a wing of an aircraft is depicted in accordance with an illustrative embodiment. Method 3000 may be a variation of method 2900 of FIG. 29.

Method 3000 may be a method for lifting a wing of an aircraft to a first height relative to a fuselage of the aircraft, the wing being on a mounting ring disposed on the fuselage. Method 3000 may begin by attaching a lifting assembly to the mounting ring (operation 3002). Next, method 3000 may include attaching a first base assembly to a fitting connected to the fuselage (operation 3004). Next, method 3000 may include moving the lifting assembly away from the base assembly using a biasing system attached to the lifting assembly, the moving causing the mounting ring to move away from the fuselage (operation 3006). Next, method 3000 may include removing the first base assembly (operation 3008). Next, method 3000 may include attaching a second base assembly to the fitting (operation 3010). Finally, thereafter, method 3000 may include repeating moving the lifting assembly away from the base assembly using the biasing system, the repeating moving causing the mounting ring to move away from the fuselage to the first height (operation 3012).

Method 3000 may be varied. For example, method 3000 may include, before removing the first base assembly, inserting a retaining object between the fuselage and a bottom of the base assembly. In this case, method 3000 may also include, after attaching the second base assembly, removing the retaining object.

In a different illustrative embodiment, the lifting assembly may be a lifting bracket. In this case, method 3000 may include reacting a bending moment in the lifting bracket against the second base assembly while moving the lifting assembly.

Figure 31:
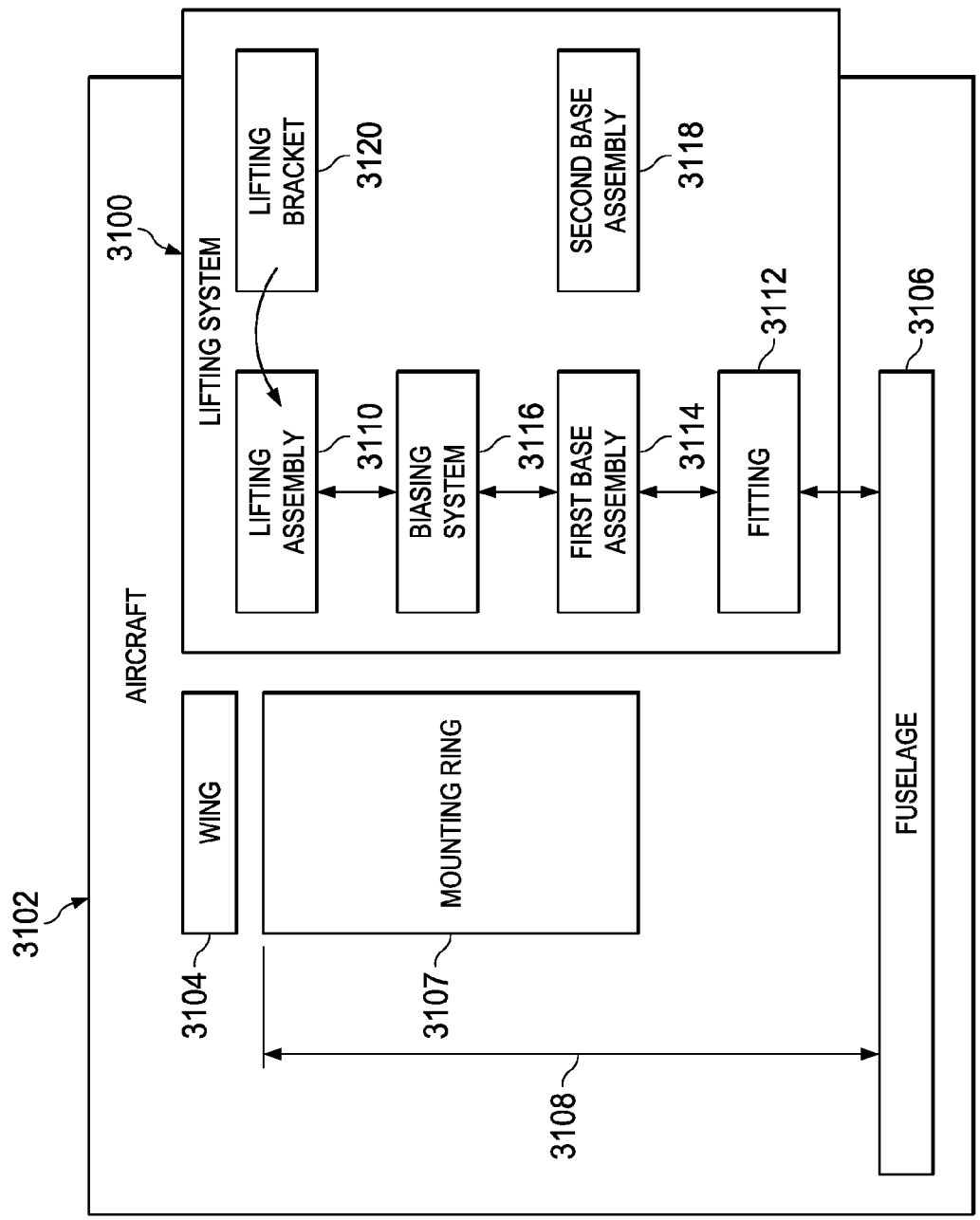
FIG. 31 is a block diagram of a lifting system in accordance with an illustrative embodiment.

FIG. 31 is a block diagram of a lifting system in accordance with an illustrative embodiment. Lifting system 3100 may be a variation of the lifting systems shown in FIG. 22 through FIG. 28. Lifting system 3100 may be used to implement the methods described with respect to FIG. 29 and FIG. 30.

Lifting system 3100 may be a system for lifting wing 3104 of aircraft 3102 to first height 3108 relative to fuselage 3106 of aircraft 3102, wing 3104 being on mounting ring 3107 disposed on fuselage 3106.

Lifting system 3100 may include lifting assembly 3110 connected to mounting ring 3107. Lifting system 3100 may also include fitting 3112 connected to the fuselage. Lifting system 3100 may also include first base assembly 3114 connectable to fitting 3112. Base assembly 3114 has a first length.

Lifting system 3100 may also include biasing system 3116 attached to lifting assembly 3110. Biasing system 3116 may be configured to move lifting assembly 3110 away from first base assembly 3114. Lifting system 3100 may also include second base assembly 3118 which is connectable to fitting 3112. Second base assembly 3118 may have a second length greater than the first length. In an illustrative embodiment, lifting assembly 3110 may include lifting bracket 3120 configured to react a bending moment against the second base assembly when lifting assembly 3110 is moved.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, in some advantageous embodiments, the base assemblies may be installed before the lifting assemblies. In yet other advantageous embodiments, a base assembly and a lifting assembly may be installed at the same time at a particular location. In yet other advantageous embodiments, the biasing systems may already be associated with the lifting assemblies. In some advantageous embodiments, the biasing systems may be used with safety blocks, lift spacers, and/or other components to provide additional lift. In other advantageous embodiments, the biasing systems may be used to retract lift provided by the lifting assemblies.

Thus, the different advantageous embodiments may provide a method and apparatus for moving a wing. In one advantageous embodiment, a plurality of lifting assemblies may be configured to be attached to a first plurality of channels in a ring associated with a wing of an aircraft. A plurality of base assemblies may be configured to be attached to a plurality of fittings with a second plurality of channels associated with a fuselage of the aircraft. A plurality of biasing systems may be configured to move the plurality of lifting assemblies away from the plurality of base assemblies such that the ring moves away from the fuselage.

With the wing lift system in the different advantageous embodiments, the time and expense needed to perform maintenance on an aircraft, such as tilt-rotor aircraft 402, may be reduced. In the different advantageous embodiments, the wing lift system may reduce or eliminate the need for a crane and the number of people currently needed to move the wing into a position to perform maintenance. Further, with the different advantageous embodiments, the movement of the wing away from the fuselage may be such that removal or disconnection of components between the wing and the fuselage may be reduced or unnecessary.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for lifting a wing connected to a mounting ring disposed on a fuselage of an aircraft to a first height relative to a fuselage of the aircraft, the method comprising:
    attaching a lifting assembly to the mounting ring;
    attaching a first base assembly to a fitting connected to the fuselage;
    moving the mounting ring away from the fuselage to a second height via moving, using a biasing system attached to the lifting assembly, the lifting assembly away from the first base assembly;

removing the first base assembly from the fitting;
attaching a second base assembly to the fitting; and
thereafter, moving, the mounting ring further away from the fuselage to the first height, via moving, using the biasing system, the lifting assembly away from the second base assembly.

2. The method of claim 1, further comprising the second base assembly differing from the first base assembly.

3. The method of claim 2, further comprising the first base assembly comprising a first length and the second base assembly comprising a second length greater than the first length.

4. The method of claim 3, further comprising the mounting ring comprising a flange limiting lifting of the mounting ring by lifting methods not using the first base assembly and the second base assembly.

5. The method of claim 3, further comprising a first difference, between the second length and the first length, at least equal to a second difference, between the first height and the second height achieved after moving the lifting assembly but before removing the first base assembly.

6. The method of claim 5, further comprising:
the biasing system comprising a piston; and
pressing the piston against an anvil of the first base assembly.

7. The method of claim 6, further comprising limiting extending, out of the biasing system, the piston by a distance greater than the second height.

8. The method of claim 1 further comprising: before removing the first base assembly, inserting a retaining object between the fuselage and bottom of the mounting ring.

9. The method of claim 8 further comprising: after attaching the second base assembly, removing the retaining object.

10. The method of claim 9, further comprising a plurality of retaining objects comprising blocks cumulatively comprising a material strength sufficient to support a weight of the mounting ring.

11. The method of claim 1, further comprising the fitting comprising a first plurality of channels receiving bolts connecting the fitting to the first base assembly and later to the second base assembly.

12. The method of claim 11, further comprising the lifting assembly comprise a second plurality of channels that receive second bolts connecting the mounting ring to the lifting assembly.

13. The method of claim 12, further comprising the first plurality of channels being unaligned with the second plurality of channels.

14. The method of claim 1 further comprising:
removing the second base assembly;
attaching a third base assembly to the fitting; and
thereafter, moving the mounting ring further away from the fuselage via moving, using the biasing system, the lifting assembly away from a third base assembly.

15. The method of claim 14 further comprising: before removing the second base assembly, inserting a second retaining object between the fuselage and of the mounting ring.

16. The method of claim 15 further comprising: after attaching the third base assembly, removing the second retaining object.

17. The method of claim 1 further comprising: attaching the fitting to the fuselage.

18. The method of claim 1, further comprising:
the lifting assembly comprising a lifting bracket; and
reacting a corresponding bending moment in the lifting bracket against the second base assembly while moving the lifting assembly.

19. A method for lifting a wing on a mounting ring disposed on a fuselage of an aircraft to a first height relative to the fuselage,
the method comprising:
attaching a lifting assembly to the mounting ring;
attaching a first base assembly to a fitting connected to the fuselage;
moving, to a second height away from the fuselage, the mounting ring via moving, away from the first base assembly, the lifting assembly;
removing the first base assembly from the fitting;
attaching a second base assembly to the fitting; and
thereafter, moving, the mounting ring to a first height via moving, using a biasing system
comprising a piston pressing against the second base assembly, the lifting assembly away from the second base assembly, the first height being a greater distance away from the fuselage than the second height.

20. The method of claim 19 further comprising:
before removing the first base assembly from the fitting, inserting a retaining object between the fuselage and a bottom of the mounting ring; and
after attaching the second base assembly, removing the retaining object.

21. The method of claim 19, further comprising:
the lifting assembly comprising a lifting bracket; and
reacting a bending moment in the lifting bracket against the second base assembly while moving the lifting assembly.

* * * * *

UNITED STATES PATENT AND TRADEMARK OFFICE
CERTIFICATE OF CORRECTION

PATENT NO.         : 10,065,749 B2
APPLICATION NO.    : 14/990789
DATED              : September 4, 2018
INVENTOR(S)        : Scheerer et al.

It is certified that error appears in the above-identified patent and that said Letters Patent is hereby corrected as shown below:

Column 20, Line 60, change "relative to a fuselage" to -relative to the fuselage-
    Column 22, Line 6, change "attaching a third base assembly" to -attaching the third base assembly-
    Column 22, Line 9, remove "of" preceding "the mounting ring"

Signed and Sealed this
Twelfth Day of February, 2019

Andrei Iancu
*Director of the United States Patent and Trademark Office*